Dec. 26, 1944.                    C. Z. MONROE                    2,365,832
                              FRUIT JUICE MACHINE
                          Filed Jan. 15, 1941        16 Sheets-Sheet 1

INVENTOR
Charles Z. Monroe

BY
                                                    ATTORNEY

Dec. 26, 1944.   C. Z. MONROE   2,365,832
FRUIT JUICE MACHINE
Filed Jan. 15, 1941   16 Sheets-Sheet 2

INVENTOR
Charles Z. Monroe
BY  *J. Calvin Brigher*
ATTORNEY

Dec. 26, 1944.  C. Z. MONROE  2,365,832
FRUIT JUICE MACHINE
Filed Jan. 15, 1941   16 Sheets-Sheet 3

INVENTOR
Charles Z. Monroe
BY
ATTORNEY

Dec. 26, 1944. C. Z. MONROE 2,365,832
FRUIT JUICE MACHINE
Filed Jan. 15, 1941 16 Sheets-Sheet 5

INVENTOR
Charles Z. Monroe
BY *J. Carlton Bugler*
ATTORNEY

Dec. 26, 1944.  C. Z. MONROE  2,365,832
FRUIT JUICE MACHINE
Filed Jan. 15, 1941  16 Sheets-Sheet 6
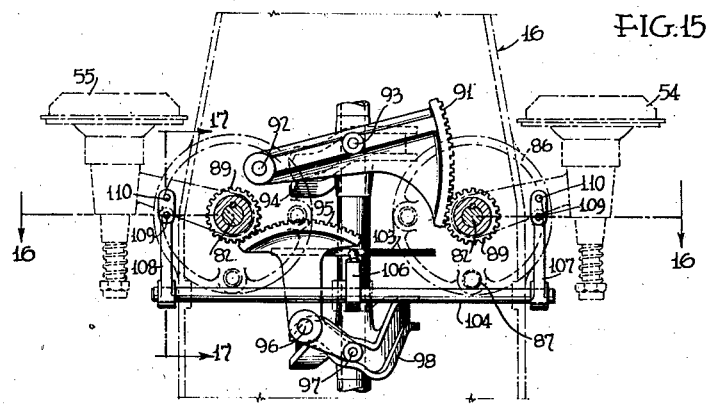
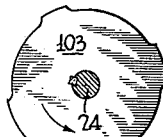
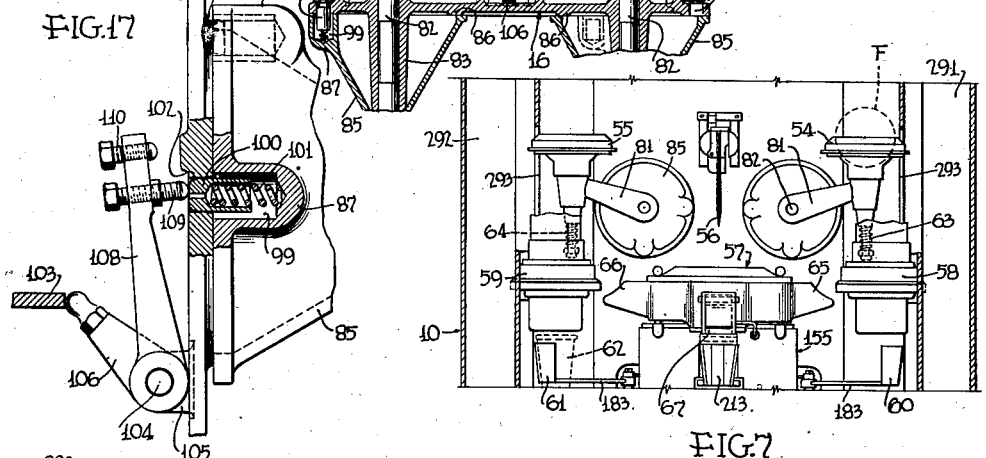
INVENTOR
Charles Z. Monroe
BY
ATTORNEY Dec. 26, 1944.  C. Z. MONROE  2,365,832
FRUIT JUICE MACHINE
Filed Jan. 15, 1941   16 Sheets-Sheet 7

INVENTOR
Charles Z. Monroe
BY J. Calvin Bright
ATTORNEY

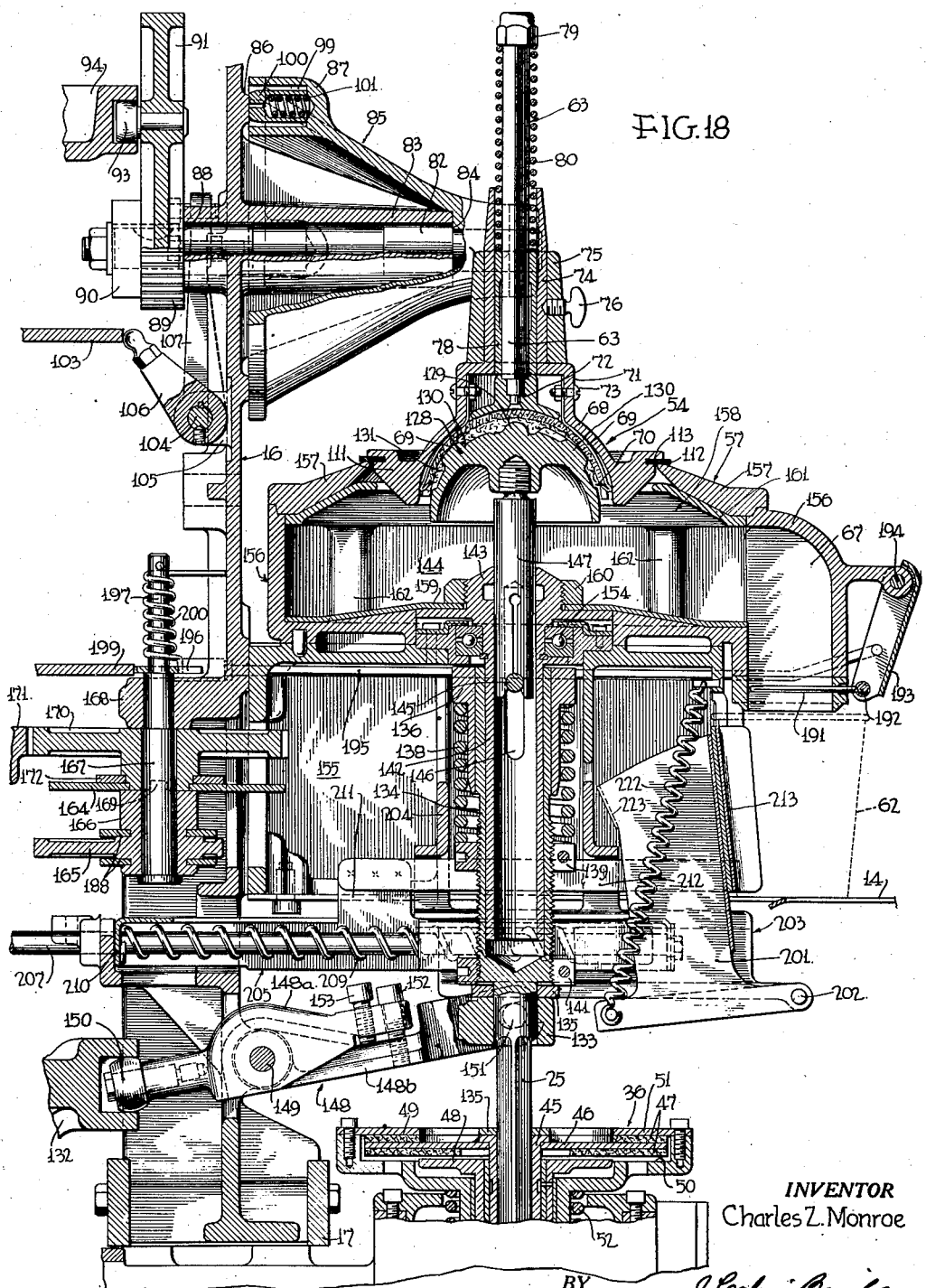

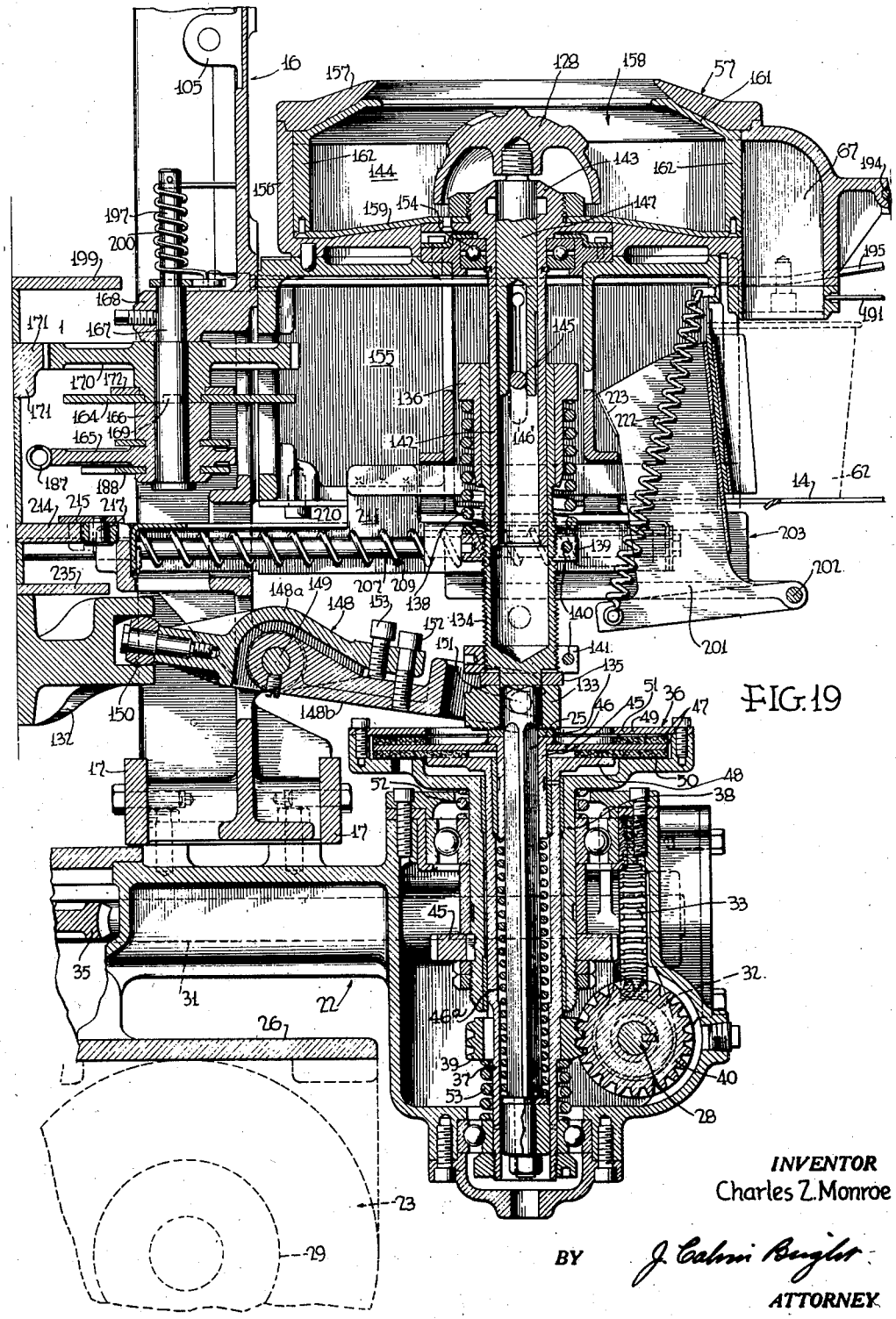

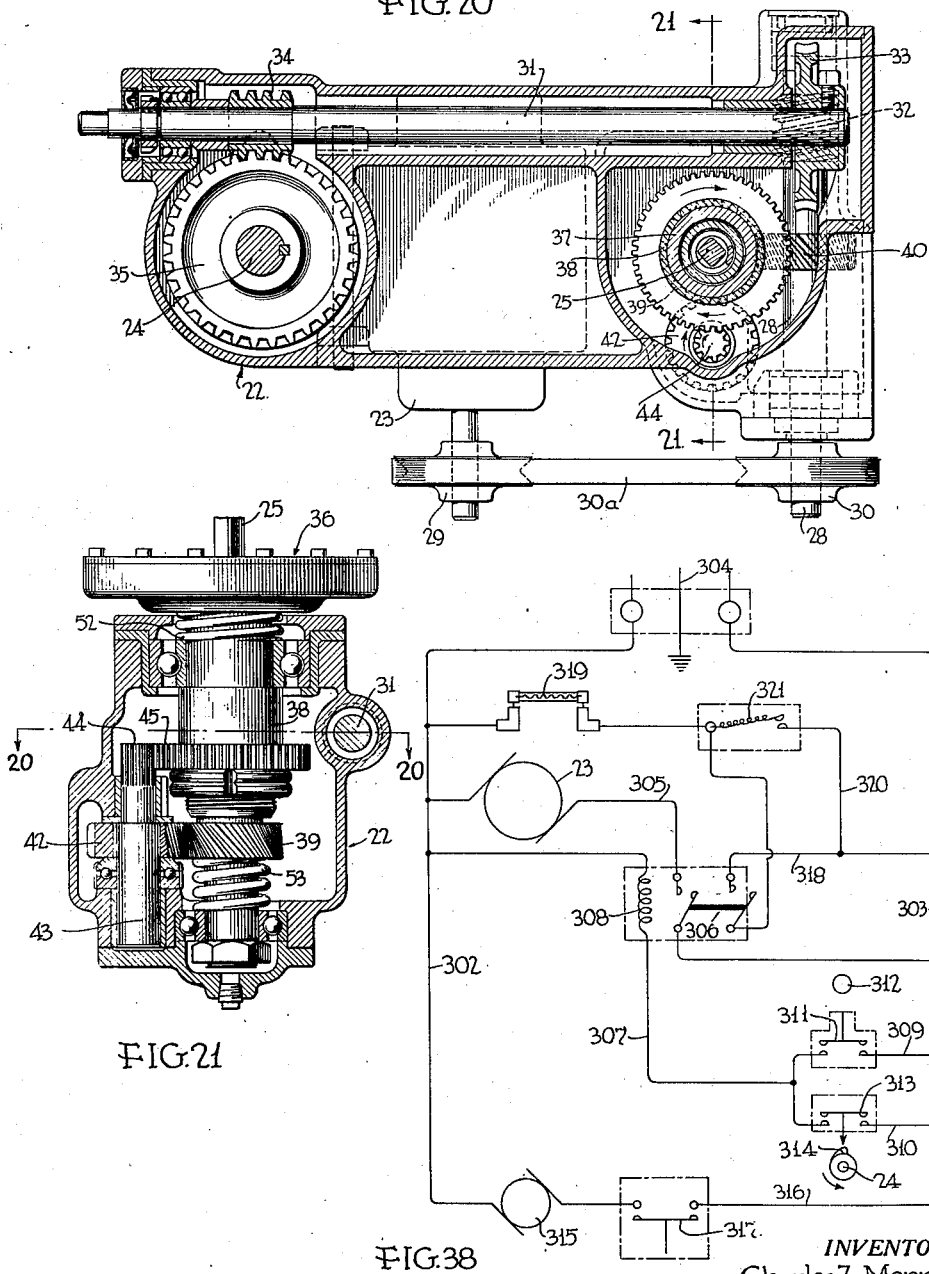

Dec. 26, 1944.  C. Z. MONROE  2,365,832
FRUIT JUICE MACHINE
Filed Jan. 15, 1941    16 Sheets-Sheet 11

INVENTOR
Charles Z. Monroe
BY
ATTORNEY

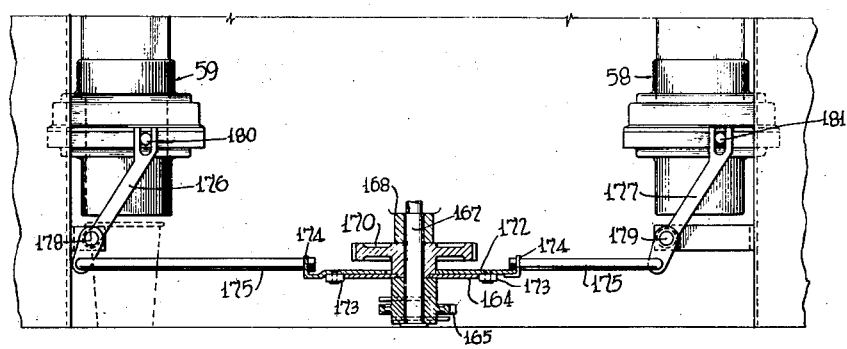
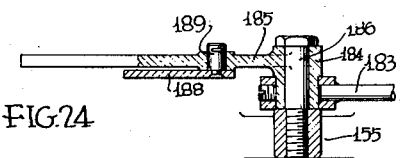
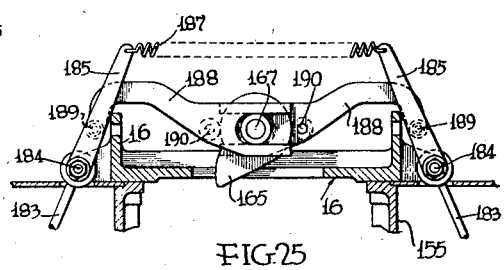
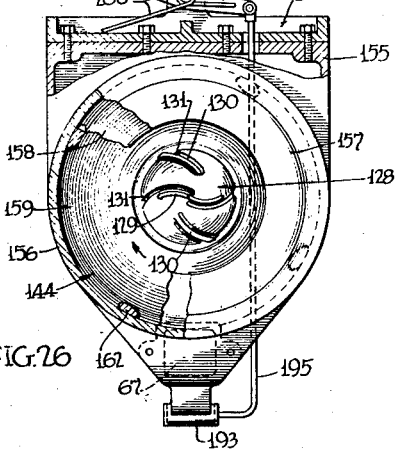
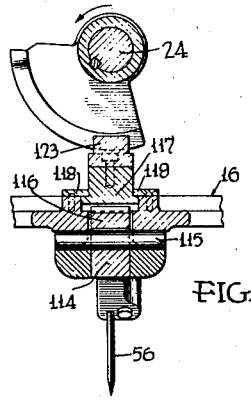
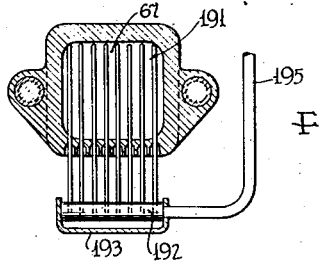

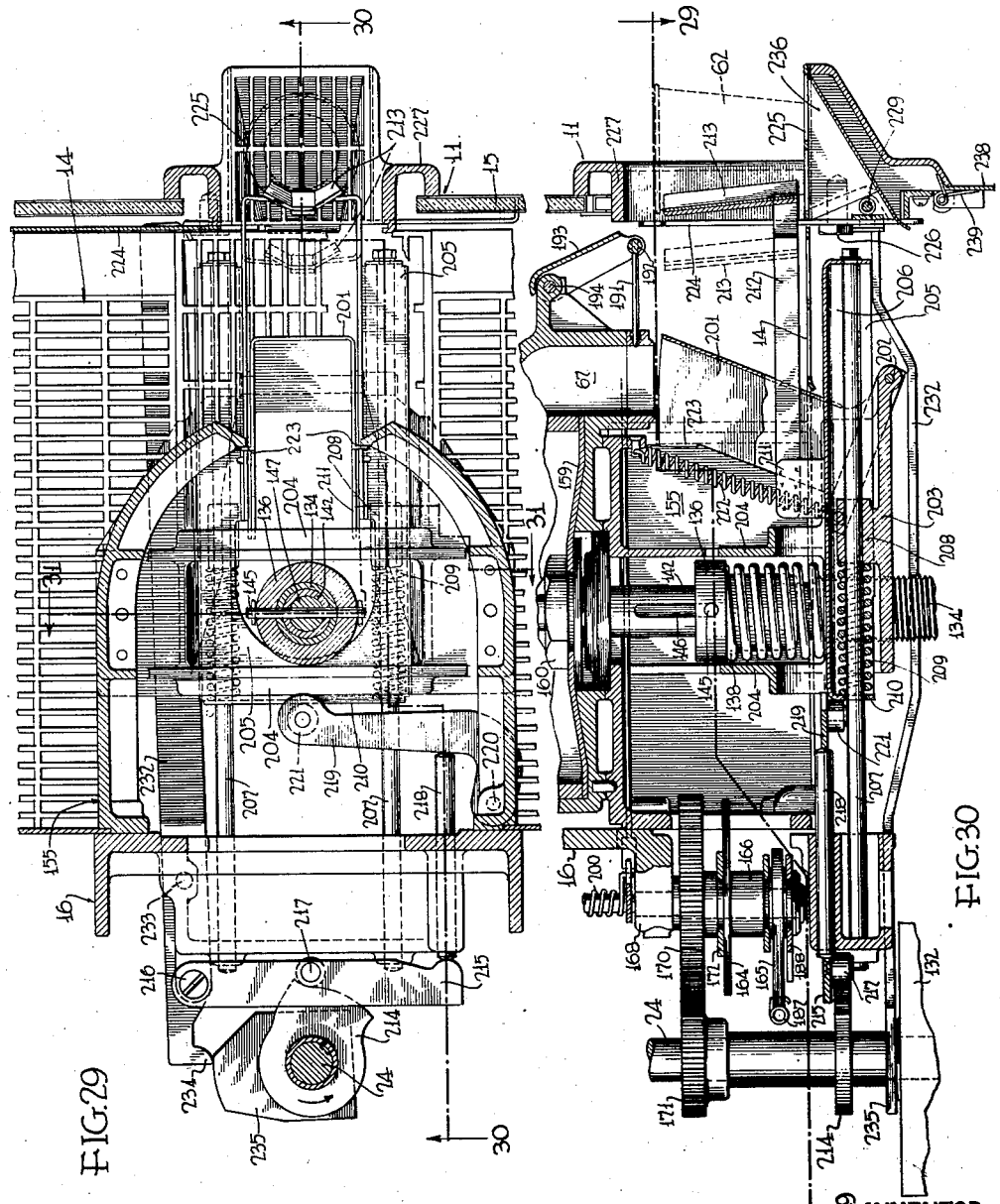

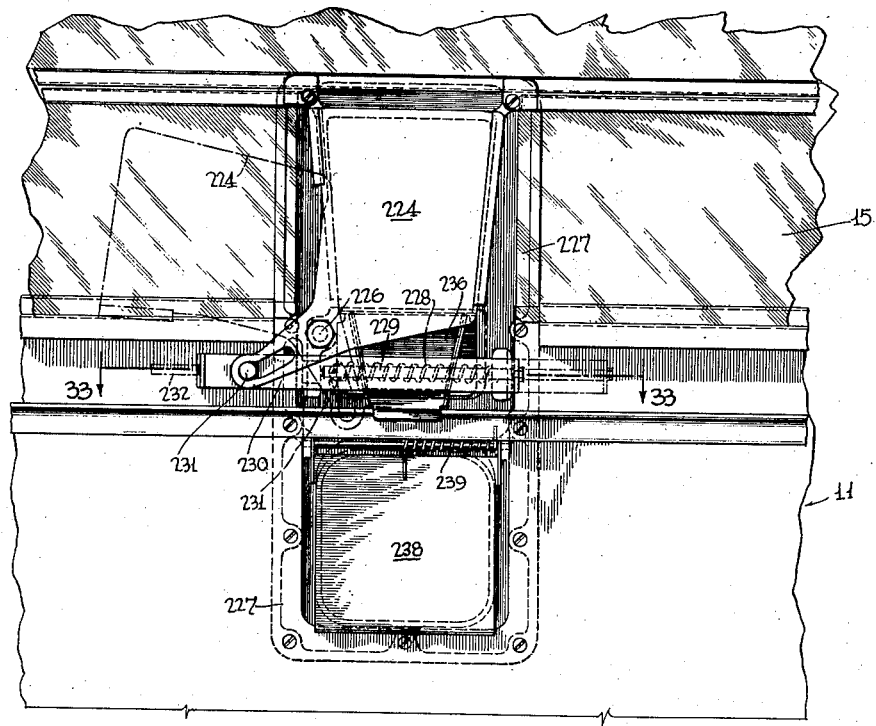
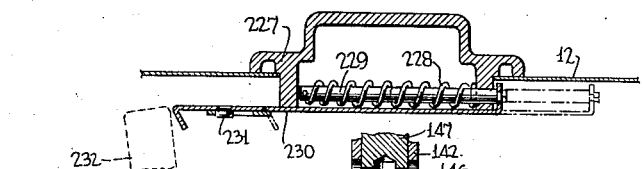
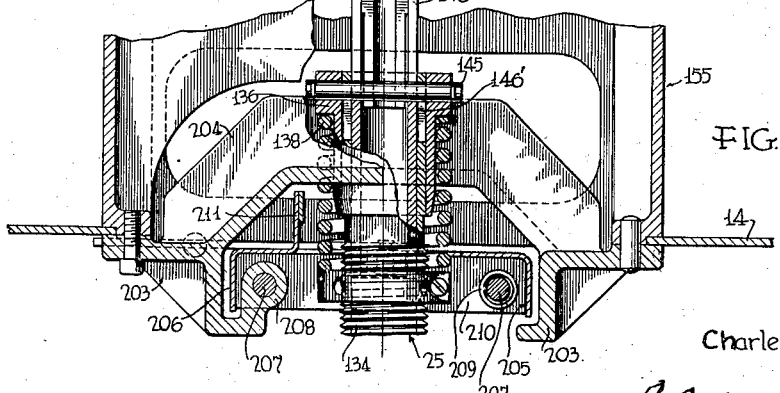

Dec. 26, 1944.    C. Z. MONROE    2,365,832
FRUIT JUICE MACHINE
Filed Jan. 15, 1941    16 Sheets-Sheet 15

INVENTOR
Charles Z. Monroe

BY *J. Calvin Bayler*
ATTORNEY

Patented Dec. 26, 1944

2,365,832

UNITED STATES PATENT OFFICE 2,365,832

FRUIT JUICE MACHINE

Charles Zienus Monroe, Detroit, Mich., assignor to Sealdsweet Sales Association, Tampa, Fla., a corporation of Florida Application January 15, 1941, Serial No. 374,459

22 Claims. (Cl. 146—3)

This application is a continuation in part of my copending application Serial No. 277,696, filed June 6, 1939, for Fruit juice machine.

The invention relates to a fruit juice extracting and dispensing machine, and more particularly to a machine of this class which is automatic in its operation and adapted to extract the juice and deliver the freshly extracted juice in a cup at the outside of the cabinet in which the machine is housed, a few moments after its extraction.

Such machines have been heretofore proposed, but, so far as applicant is aware, none have been made available to the public. The availablity of such machines in public places, such as railroad stations, office buildings, amusement parks, resorts, and other places where people congregate would be a decided contribution to the convenience and comfort of the public. All the customer would have to do, to be served with a drink of freshly extracted juice, would be to drop a coin in a slot in the machine, thus setting the machine in operation and processing the fruit right before his eyes, which itself would add to the enjoyment of the drink, and delivering a cup of freshly extracted refreshing drink promptly at the outside of the machine.

It is an object of the invention to provide a machine of this class which is reliable in operation, compact so that it can be housed in a closed cabinet of reasonable size and, therefore, readily transportable from place to place and locatable in desired places without taking up too much room.

It is further among the objects of the invention to greatly simplify the construction of such machines, to arrange the parts in such fashion as to permit their ready assembly and disassembly, to adapt the machine to production in quantities; all these objects contributing to a further object of producing the machines at low cost.

Simplicity in construction is achieved in part by having a single reamer used in extracting the juice, this reamer being associated with two fruit-gripping hands which are alternately brought into operative relation with the reamer for the extraction of the juice of a fruit.

Ease of assembly and disassembly is achieved in part by providing a central vertical main frame supporting most of the operating mechanisms of the machine, and by so associating the various parts with this frame that they can be readily assembled or disassembled therewith. This object is further achieved by assembling this main frame and associated parts as a unit subassembly, which can be readily mounted in or removed from the machine cabinet.

A further object of the invention is the provision of a reliable feed for feeding the fruit to the extracting mechanism. This is achieved in part by the provision of a novel agitator in the throat of the supply hopper which prevents jamming of the fruit around said throat or discharge opening.

A still further object is the provision of a novel driving connection between the high speed rotating reamer and a rotating juice collector, whereby the rotation of the latter is controlled to vary its speed at different times in the machine cycle.

A further object is the provision of a machine of this class which can be readily serviced, which can be kept clean, and which is at all times well ventilated by forced circulation of air.

A still further object is the provision of a charging hopper to be filled with fruit in which the fruit can at all times be maintained at the desired temperature. This object is attained by completely insulating the walls of the hopper and associated delivery passage and discharge gate, and maintaining desired temperature in this insulated chamber by a refrigerating unit controlled by a thermostatic switch.

These and other objects and advantages, as will become clear as the description proceeds, are attained by the machine and mechanisms described in detail in the following specification forming a part hereof.

In the drawings:

Figs. 7 to 14 are fragmentary sectional views transversely of the machine showing the main operating parts of the machine in the positions they will occupy successively in a full cycle of the machine;

Fig. 15 is a detail horizontal section view taken along the line 15—15 of Fig. 5, looking in the direction indicated by the arrows, and showing the driving mechanism for the hands;

Fig. 16 is a fragmentary horizontal sectional view taken substantially on the line 16—16 of Fig. 15, but with the parts in the position indicated in Fig. 12;

Fig. 17 is a fragmentary vertical sectional view on an enlarged scale through the hand-locking mechanism;

Fig. 18 is an enlarged detail sectional view similar to the section of Fig. 5, showing the parts of the juice extracting and collecting mechanism and the operating means therefor, the parts being shown in the position of Fig. 10;

Fig. 19 is a similar sectional view to Fig. 18 showing further parts of the operating means in section, the parts being shown in the position for high-speed operation of the juice collector;

Fig. 20 is a fragmentary horizontal sectional view through the gear casing taken substantially on the line 20—20 of Figs. 5 and 21;

Fig. 21 is a fragmentary sectional view taken substantially on the line 21—21 of Fig. 20;

Fig. 23 is a fragmentary vertical part-sectional view, as seen from the rear, of the cup dispensers and their operating mechanism;

Fig. 24 is an enlarged fragmentary detail sectional view on the line 24—24 of Fig. 22 showing parts of the cup delivery mechanism;

Fig. 25 is a fragmentary detail sectional plan view through the backbone of the machine showing parts of the cup delivery mechanism and the actuating means therefor;

Fig. 26 is a fragmentary detail sectional plan view showing parts of the juice collector, and strainer mechanism;

Fig. 27 is an enlarged detail sectional plan view taken through the strainer housing;

Fig. 28 is a detail horizontal sectional view taken substantially on the line 28—28 of Fig. 5 showing parts of the knife-actuating mechanism;

Fig. 29 is an enlarged fragmentary sectional plan view taken substantially on the line 29—29 of Fig. 30 showing the cup-pushout and refuse chute and the operating means therefor;

Fig. 30 is a similarly-enlarged vertical sectional view taken substantially on the line 30—30 of Fig. 29;

Fig. 31 is a similarly-enlarged fragmentary vertical sectional view taken substantially on the line 31—31 of Fig. 29;

Fig. 32 is a detail rear elevational view of the pushout gate and the used cup disposal means at the front of the machine;

Fig. 33 is a detail sectional view taken substantially on the line 33—33 of Fig. 32;

Fig. 38 shows a diagram of a wiring system which may be employed.

Figures 1, 2:
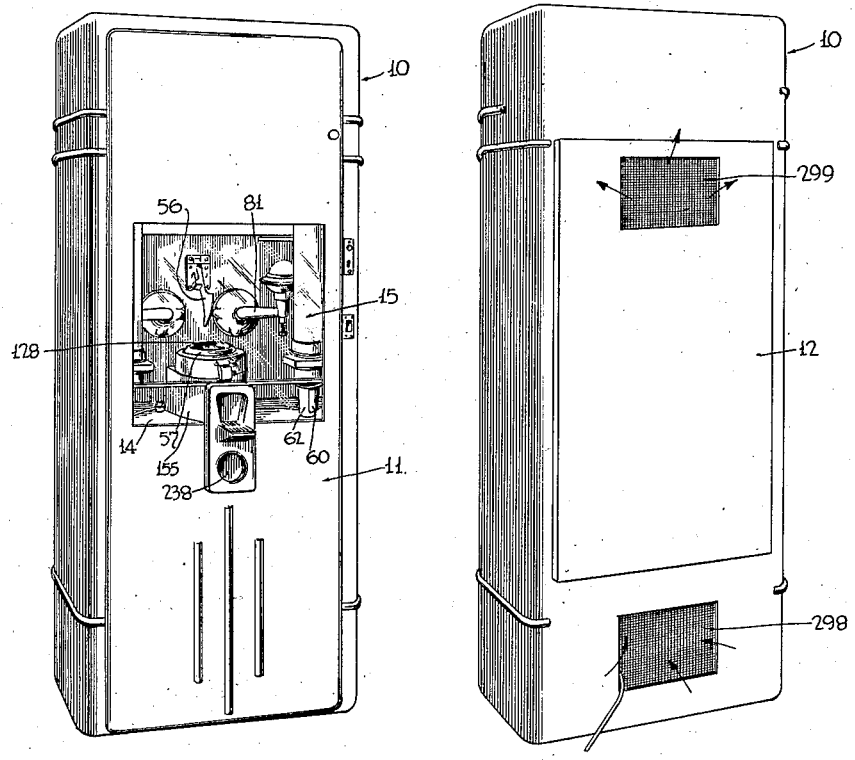
Figs. 1 and 2 are front and rear views, respectively, of the machine.
Figure 4:
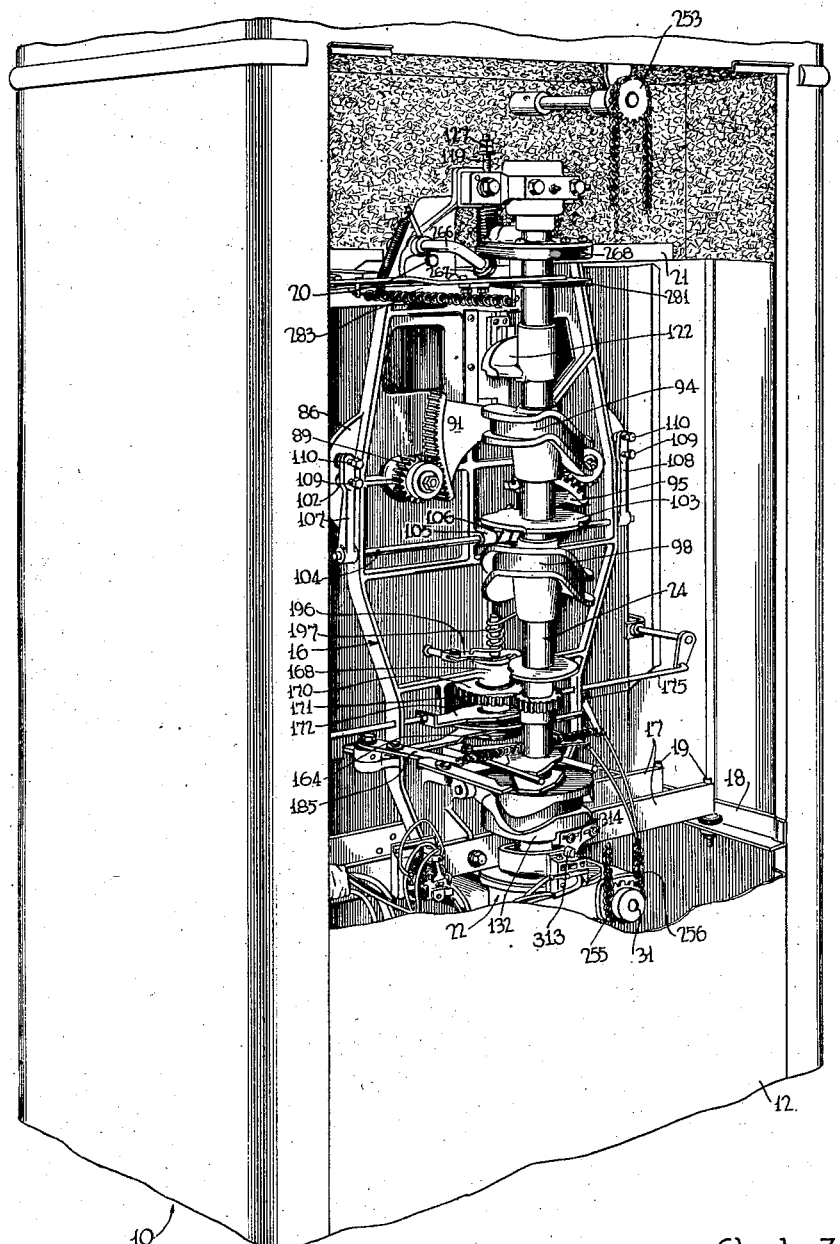
Fig. 4 is an enlarged rear view of the machine, with parts broken away, showing the operating mechanism.

The machine is preferably housed in a sheet metal generally rectangular cabinet 10 suitably stiffened by framing and enclosed by sheathing. For convenience of access to the parts of the machine, the front portion of the cabinet has an opening therein of substantially the height and width of the cabinet, this opening being normally closed by a door 11 which may be securely locked in place to avoid tampering with the machine. The rear of the machine, as shown in Figs. 2 and 4, is also provided with a large rectangular opening which is normally closed by a panel 12 securely fastened in place to prevent tampering by unauthorized persons.

The cabinet is preferably vertically divided into three separate divisions by a top irregular transverse partition 13 forming the bottom of a hopper for the fruit and an inclined fruit delivery chute terminating in a discharge gate forming the lowest portion of this partition, and a lower transverse partition 14.

Between the lowest portion of the top partition and the partition 14, and extending the greater portion of the width of the door 11 is arranged a rectangular window 15, suitably glazed to permit users of the machine to look into the cabinet and see the working of the principal parts of the machine. The partition 14 forms the bottom of the space visible through the window, and is preferably formed for the most part by a reticulated plate or plates (see Fig. 22).

The main unit of the machine carrying most of the operating parts of the machine and insertable and removable as a unit in the cabinet 10 includes a main vertically extending backbone or frame member 16, preferably a casting, bolted adjacent the bottom thereof (see Figs. 4 and 5) to two spaced bars 17 which rest at their ends on angles, as 18, to which they are removably secured as by bolts 19. The top of the frame member 16 is secured in place by bolts, as 20, securing it to a top cross member 21 (Figs. 4 and 6). It will be seen that, by removing the bolts 19 and 20, the entire framework and its associated parts may be slid as a unit through the rear opening in the cabinet.

Figure 5:
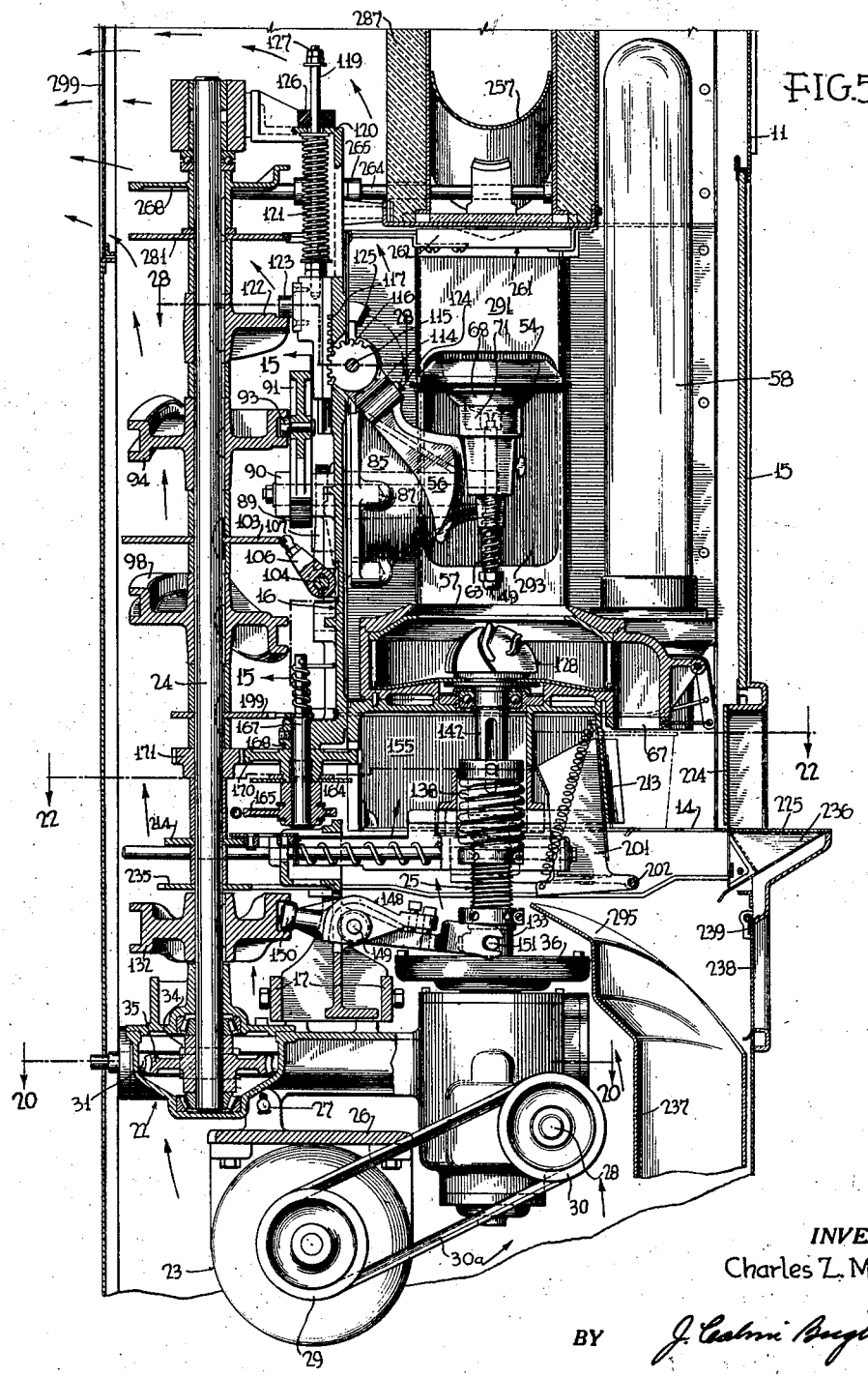
Fig. 5 is an enlarged central vertical sectional view of the portion of the machine below the hopper.
Figure 6:
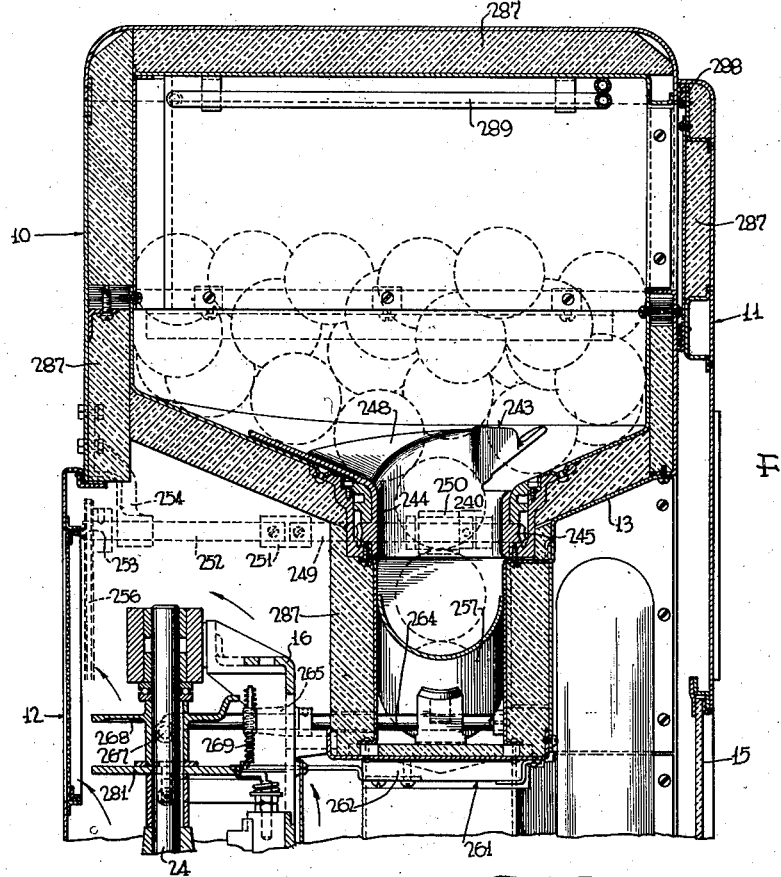
Fig. 6 is a similar section through the top portion of the machine including the hopper.

As clearly appears from Figs. 4 and 5, the main frame member 16, which for most of its length is of plate-like form reinforced by ribbing, extending transversely of the machine, is widened out fore and aft at the bottom to bridge the space between supporting bars 17, and to which it is securely bolted. A gear casing 22 is bolted to the bottom of the frame 16 from which a driving motor 23 is swung. From the rear portion of this gear casing rises the main operating cam shaft 24, controlling and timing the various mechanisms, and from the front of the casing rises the shaft 25 for driving the reamer and associated parts.

The drive from the motor to the shafts 24 and 25 is clearly shown in Figs. 5, 19, 20 and 21. The motor is suspended in a swinging bracket 26 pivoted at 27 to the bottom of the gear casing, and drives the main shaft 28 extending across the front of the gear casing and supported by suitable radial and thrust bearings adjacent its ends. This drive is through V-groove pulleys 29 and 30 secured, respectively, to the motor armature shaft and the end of the shaft 28, and a V-section belt 30a engaging the grooves of the pulleys. The pivoted support of the motor bracket 26 is so located that the weight of the motor tends to swing it in a direction to tighten the belt, and this, together with the high friction between the V-grooves and belt, insures a positive drive of the shaft 28 from the motor, and eliminates the usual separate belt-tightening pulley.

The vertical cam shaft 24 is driven from the shaft 28 through an intermediate shaft 31 extending from front to rear of the casing and supported by suitable bearings adjacent its ends. Suitable speed reduction to cam shaft 24 is obtained through a worm 32 on shaft 28 engaging a worm gear 33 on shaft 31, and a second worm 34 on shaft 31 engaging a worm gear 35 on the lower end of the cam shaft 24. Suitable antifriction combined radial and thrust bearings (see Fig. 5) support the shaft 24, on opposite sides of the gear 35, in the gear casing 22.

The reamer shaft 25 is driven through a clutch mechanism designated generally by 36 either from a high-speed hollow shaft 37 or from a concentric low-speed shaft 38, these shafts being mounted with respect to each other and to the gear casing in antifriction bearings, see Fig. 19.

The high-speed shaft 37 is directly driven from the main shaft 28 through spiral gears 39 and 40 secured to the respective shafts. The low-speed shaft 38 is indirectly driven by reduction gearing from the shaft 28. The spiral gear 39 on shaft 37 meshes with a spiral gear 42 on a short counter-shaft 43. The counter-shaft 43 drives through a pinion 44 thereon to a large gear 45 on the low-speed sleeve shaft 38.

The reamer shaft 25 at its lower end is carried by spaced bearings in the hollow high-speed shaft 37 and has a longitudinal sliding but non-rotary connection (see Fig. 19) to a bearing sleeve 45 carrying a clutch plate 46. This clutch plate may carry suitable antifriction facings 47 on its opposite sides.

The high-speed shaft 37 has at its upper end a clutch disc 48, which, when the shaft is lowered by means later to be described, will cause the disc 48 to engage the clutch plate 46 and thus drive the reamer shaft at high speed from the high-speed shaft 37.

The clutch plate 46 is of larger diameter than the disc 48, its outer portion being received between upper and lower spaced clutch faces 49, 50 carried by a disc 51 on the upper end of the low-speed shaft 38. When the reamer shaft 25 is raised, the clutch plate 46 thereon is raised by a spring 46a and leaves the high-speed disc 48 and engages the face 49 of the low-speed disc 51 to drive the reamer shaft at the lower speed, the clutch faces being forced together more firmly by the compression of spring 46a in the raising of shaft 25.

The clutch mechanism has a further function in acting as a brake to stop the machine. A stiff brake spring 52 of few turns is inserted between a shoulder on the fixed top bearing of the shaft 38 and the disc 51, this spring normally holding the shaft and the clutch faces attached thereto in a raised position. It will be noted that the pinion 44 has greater width than the gear with which it meshes to allow for slight longitudinal movement of the shaft 38.

Further, a stiff spring 53 is inserted between the lower fixed bearing of shaft 37 and a shoulder on the shaft, in this instance formed by the gear 39.

If, now, the reamer shaft 25 is forced downwardly with sufficient force, it will first compress the spring 53, thus slightly lowering the high-speed shaft through the engagement of clutch plate 46 with clutch disc 48. A slight lowering of the shaft is sufficient to cause the outer portion of the clutch plate 46 to engage the lower clutch face 50 on the disc 51, and upon further movement compressing the brake spring 52. By reason of the very much larger area of engagement between plate 46 and face 50 than the area of engagement between plate 46 and disc 48, the speed of the reamer shaft will be rapidly reduced to the low speed, and through the gearing, the clutch mechanism will act as a brake to quickly stop the overrun of the motor and the entire machine.

The purpose of the high and low speeds of the reamer shaft and the necessity for quick stopping of the machine upon completing a cycle will be better understood from the description of the operation of the machine as a whole which will be hereinafter given.

In Figs. 7 to 14 are shown the main moving parts of the machine visible to an observer looking through the window 15. In these views the parts are shown at successive stages in a cycle of the machine. The hands for receiving a fruit are designated by numerals 54 and 55, the knife for cutting the fruit in two by 56, the reamer housing by 57, the right- and left-hand cup dispensers by 58 and 59, the right- and left-hand cup deliverers by 60 and 61, the cups generally by numeral 62, the ejector stems associated with the right and left hands by 63 and 64, and their cooperating right and left ejector abutments by 65 and 66. It will be noted that the parts are generally symmetrically arranged on opposite sides of the vertical central fore and aft plane of the machine.

Figure 9:
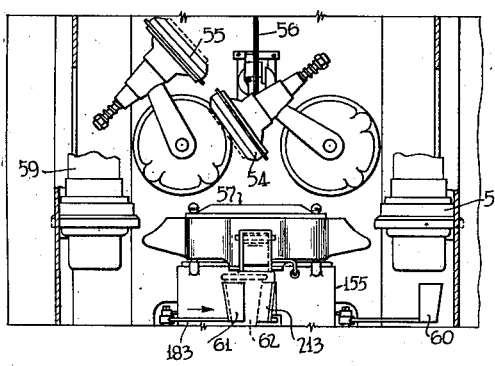
Figure 10:
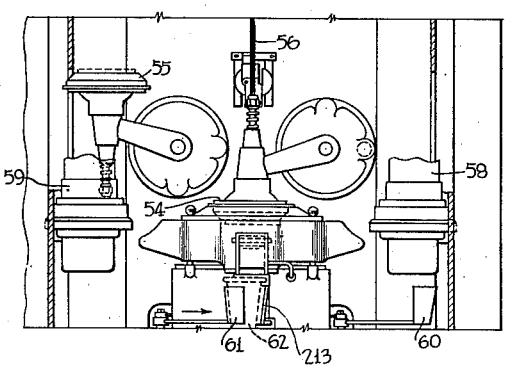
Figure 11:
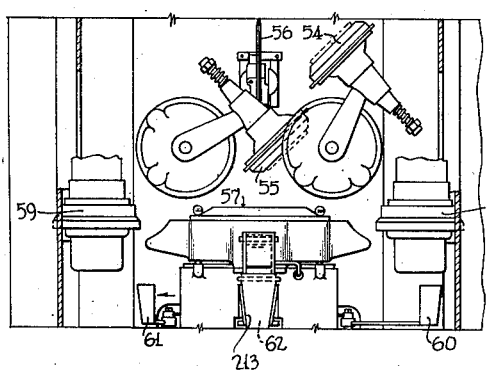
Figure 12:
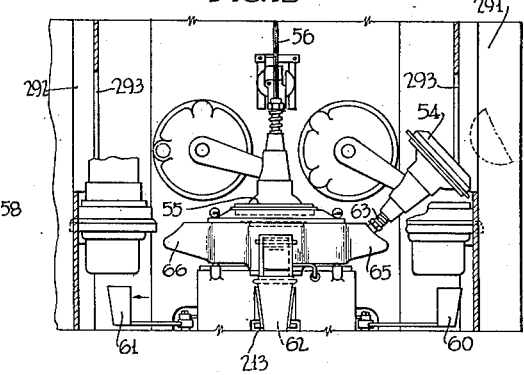

Fig. 7 shows the parts at the start of the machine cycle after a fruit, as F, has been deposited in the right hand 54. The knife 56 is in substantially its lower cocked position. In Fig. 8, the hands have moved toward each other where both grip the fruit, and the knife has passed between them to sever the fruit in two. In this position, they are locked by means to be described later on. In Fig. 9 the hands are rotating in the same direction, the right hand moving toward a position vertically above the reamer housing 57. In Fig. 10 the right hand is locked in position for reaming, and the part of the fruit gripped thereby is being operated on by the reamer to extract the juice. In Fig. 11, the hands are both rotating in the same direction opposite to that shown in Fig. 9. In Fig. 12, the left hand is locked in the reaming position and the right hand has moved to the ejecting position, with its ejector stem 63 in engagement with the abutment 65 and the skin being ejected.

Figure 13:
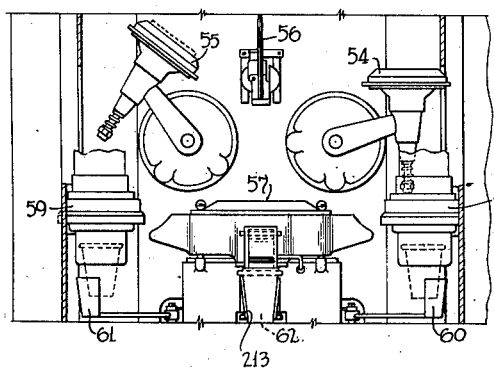
Figure 14:
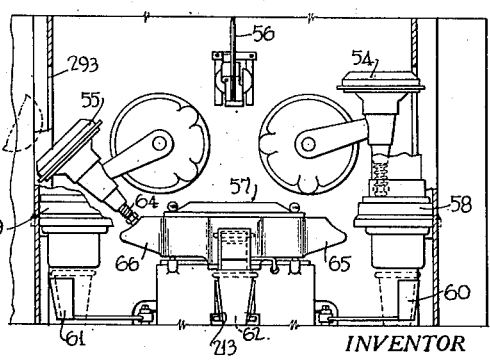

In Fig. 13, the right hand has returned to the starting position, and the left hand is moving toward the ejecting position. In Fig. 14, the left hand has moved to the ejecting position, from which it will be immediately returned to the starting position. The parts are then back to the position of Fig. 7 ready for a succeeding cycle.

In the starting position, it will be noted a cup 62 has been dropped from left-hand dispenser 58 in front of left cup deliverer 61. In Figs. 8, 9 and 10, this cup is being moved by the deliverer 61 to central position under the discharge spout 67 of the reamer housing, which position it reaches in Fig. 11. In Fig. 13 a cup is being simultaneously dropped by both dispensers 58 and 59 in front of the respective deliverers 60 and 61, and in Figs. 11, 12 and 13 the left cup deliverer is shown slowly returned to its starting position, while the right-hand deliverer is held stationary to deliver the cup now in front of it in the succeeding cycle.

The hands and their operating mechanism

The detail of the hands and their controlling and operating mechanism is shown most clearly in Figs. 5, 15 and 18. Each hand consists of a generally semi-cylindrical cup 68 adapted to receive a fruit. Within this cup are secured a series of gripping spring fingers 69, which are preferably provided with sharp points 70 which bite into the skin of the fruit to hold the fruit part securely in place. To insure the fruit part held by the cup from turning under the reamer action, the biting points may be and preferably are inclined opposite to the direction of rotation of the reamer.

The bottom of the cup has a short cylindrical extension 71 to house an ejector head 72 in its retracted position. The secured ends of the spring fingers 69 lie in slots formed in the inner face of this cylindrical extension and are secured by the screws 73.

To facilitate removal of the cups 68 and their replacement by cups of a different size or form, each cup is provided with a reduced cylindrical extension 74 fitting into the bore of a socket head 75 and locked in place by a set screw 76. The stem, as 63, of the ejector head 72 is guided by a bearing sleeve 78 secured, as by a press fit, in this reduced extension 74 and extends freely. The ejector head has its inner face conform to the curvature of the cup, and bears during the reaming of the fruit upon the skin thereof. To utilize the friction of such engagement to assist the gripping springs in preventing the rotation of the fruit under the action of the reamer, the head is non-rotatably fixed in the hand as by the engagement of its squared stem with a corresponding squarred opening in bearing sleeve 78. At its outer end, the stem has a head 79, and the ejector is normally held with its head 72 in inoperative position in the cylindrical extension of the cup by a spring 80 surrounding the stem and bearing at its opposite ends against head 79 and the end of the bearing sleeve 78. The head 72 may be a cap nut screwed on the end of the stem, which can be readily removed or replaced, thus facilitating assembly or disassembly of the parts of the ejector.

The socket head 75 is secured to an arm 81 extending at an angle to the bore in the head, this arm being secured at its opposite end to a shaft 82 mounted to rotate in an elongated bearing 83 formed by bosses projecting fore and aft of the main frame casting 16, Fig. 18. The reduced outer end of the shaft 82 forming a shoulder 84 is rigidly secured to the arm 81, and a conical extension 85 of the arm surrounds the shaft 82 and has its annular base disposed substantially in contact with an annular raised track 86 on the front face of the casting 16. The annular base of this conical portion 85 is formed with two spaced enlargements 87, the purpose of which will be later described.

The inner end of the shaft 82 also has a reduced extension forming a shoulder 88 against which is clamped a gear 89, splined to the shaft, by a nut 90. The distance between shoulders 84 and 88 on the shaft is slightly longer than the bearing 83 so as not to interfere with the free rotation of the shaft in the bearings.

As shown in Fig. 15, the rotation of the shaft 82 at the right of the figure which corresponds to the right hand of Figs. 7 to 14 is effected by a segmental rack 91 on an arm pivoted at 92 to the rear face of the casting 16. A cam follower roller 93 intermediate the ends of the arm of rack 91 projects into a cam groove on the barrel cam 94 splined to the shaft 24.

The left hand 55 is driven similarly to the right hand 54, its segmental rack 95 being, however, carried by a bent lever pivoted intermediate its ends on the pivot 96 and having its other end provided with a cam follower roller 97 similar to roller 93 and engaging with a cam groove on the barrel cam 98 splined to the shaft 24 below the cam 94.

To relieve the strain on the driving mechanism for the hands at times when it would be placed under the severest strains, namely when the fruit is being cut and when the hands are in operative relation to the reamer, each of the hands is provided with a locking means already referred to. Such locking means is best shown in Figs. 15, 16 and 17. Each of the two spaced enlargements 87 on the base of the conical extension 85 of each hand is formed with a pocket 99 in which is slidably mounted a locking plunger 100 continuously biased to its locking position by a coil spring 101. These locking plungers, during most of the rotary movements of the hands, have their outer ends ride upon the annular tracks 86 with the main bodies thereof withdrawn within their respective recesses and the springs 101 under tension. A pair of holes 102 is arranged adjacent the opposite margins of the main frame casting 16, each of them being arranged to cooperate with the pair of locking plungers associated with the adjacent hand 54 or 55.

When the hands are rotated from the position of Fig. 7 to the cutting position of Fig. 8, the lower locking plungers 100 (Fig. 7) are moved opposite the holes 102 and at once snap into the same to lock both the hands in the cutting position of Fig. 8. After the locking plungers have been forced back out of the holes 102 by the means to be described, each of the hands is free to rotate further to the reaming position, indicated for the right hand in Fig. 10 and for the left hand in Fig. 12. In this position the other of the locking plungers associated with each hand is in position to snap in to the locking hole 102 associated with said hand, as indicated in connection with the left hand in Figs. 16 and 17, which is shown in these figures locked in the reaming position.

The release of the locking plungers 102 is effected in timed relation to the rotation of the hands through a cam 103 splined to the main cam shaft 24 and disposed between the hand-operating barrel cams 94 and 98, see Fig. 5. A horizontal rock shaft 104 extends across the back of the main frame 16 and is pivoted in ears 105 projecting from the frame. Centrally of this shaft between two ears 105, the shaft has secured to it a rearwardly and upwardly extending arm 106, the end of which is rounded and engages the peripheral cam face on cam 103. From the ends of the shaft, in vertical alignment with the locking holes 102, are arranged a pair of upwardly extending arms 107, 108 rigidly secured to the shaft 104. Each of these arms has a projection 109 thereon in horizontal alignment with the associated hole 102. This projection may be an adjustable screw locked in adjusted position by a nut. In addition, a stop screw 110 may be provided at the end of each arm adapted to engage the frame and prevent overswinging of the rock shaft 104.

From Fig. 16, it will be seen that the cam 103 has three spaced high spots. It will be understood that when the follower on arm 106 is resting on one of these high spots, the projections 109 on the arms 107 and 108 are entered into the holes 102 to press back the locking plungers 100 if they are projected into the holes, thereby releasing the associated hand for rotation. When the low spots on the cam are opposite the arm 106, the projections 109 are free to be swung out of the holes, by the snapping of either one or both of the locking plungers 100 into its associated locking hole 102 under the action of its spring. The high points of the cam are so arranged with respect to each other and to the movements of the hands, that the hands will be locked only in the cutting and reaming positions, but freed for rotation upon the completion of these operations.

As shown in Fig. 18, the cup 68 of each of the hands is provided with a peripheral enlargement 111 which fits fairly closely into an opening in the top of the reamer housing, with the margin of the cup projecting well within the housing, when the hand is in reaming position. This prevents splashing of juice outside the housing during extraction, but to make assurance doubly sure, a sealing ring 112, as of rubber, may be secured in a peripheral groove 113 of the enlargement 111, this ring being pressed down upon the margin of the opening in the housing when the hand is in the position of Fig. 18, thereby precluding any possible throwing of juice between the band and housing.

The knife and its operating mechanism

Turning now to Figs. 5, 7-14 and 28, the knife 56 for cutting the fruit may comprise a thin blade having a cutting edge of substantially V-form adapted to enter the fruit with the point of the V and cut with a slicing action. To this end, it is secured in a knife-holding block 114 which is in turn pivoted on a horizontal pivot pin 115 between bosses projecting from the front face of the casting 16, see Figs. 5 and 28.

To actuate the knife, the block 114 is formed on a portion thereof projecting through a slot in the casting 16, with a semi-circular toothed sector 116 meshing with a vertically slidable rack 117 held to the sector and guided by gibs 118 provided therefor on the rear face of the casting 16. A rod 119 rigidly secured to the top of the rack 117, is projected through and guided by a rearwardly extending lug 120 from main casting 16. Between the top of the rack and the lug 120 the rod is surrounded by a strong coil spring 121 for actuating the knife. The knife is moved to the cocked position shown in Fig. 5 by a steep sloping parti-circular face cam 122 splined to shaft 24 and spaced from the upper or right-hand actuating cam 94 by a suitable spacer sleeve. A cam follower 123 is rigidly secured through a block to the rear face of the rack 117 between spaced top and bottom shoulders by screws, see Figs. 5 and 28, and projects into the path of the cam 122. The cam 122 has a sudden drop off from its high point which suddenly releases the rack to the action of the now fully compressed spring to actuate the knife for the cutting operation. The knife is then swung with lightning-like speed to sever the fruit, and to cushion its final upward swing a projecting abutment 124 comes into contact with a cushioned abutment 125 on the front face of the casting 16. At the same time, the downward movement of the rack is cushioned by a block of rubber 126 arranged between a nut 127 screwed on the end of rod 119, which nut is preferably locked in any suitable manner against unscrewing.

From the foregoing, it will be seen that an exceedingly simple and rugged knife-operating mechanism has been provided and one which operates without fail to sever the fruit no matter how tough the skin or how numerous the seeds.

The reamer and juice-collecting device

By the present invention a single reamer, designated by reference numeral 128, cooperates alternately with the hands for the extraction of the juice of a fruit in the machine cycle. Referring to Figs. 5, 18, 19 and 26, it will be seen that the reamer has a dome-shaped face, the surface of which may be provided with a central shallow rounded sinuous rib as 129, passing through the reamer axis and having its ends terminating short of the margins of the dome. In addition, the face of the dome has projecting therefrom a pair of shallow relatively flat-faced ribs 130 spaced from the central rib and extending in opposite directions from a plane passing through the axis of the reamer to the margin of the dome. These ribs 130 extend generally in the same direction as the parts of the sinuous rib located on the same side of said plane, but diverge therefrom toward the margin of the dome. Grooves 131 are provided paralleling each of the ribs, the grooves being arranged forward of the associated ribs with respect to the direction of rotation of the reamer, and the grooves associated with the central sinuous rib being extended beyond its ends to the margin of the dome.

This arrangement of ribs facilitates the breaking-up of the cells of the pulp and the extraction of the juice without tearing entire cells, and the arrangement of the grooves provides for the ready flow of the extracted juice to the margin of the reamer for discharge therefrom.

When the hand is in the extracting position, the reamer is caused to approach the hand at a speed which is dependent upon the slope of the barrel cam 132 splined on the main cam shaft 24 and connected with the reamer to move it up and down. To permit such lowering and raising of the reamer, the reamer shaft 25 is mounted to slide vertically with respect to the high speed shaft 37 against the tension of spring 46a as already described.

Above the clutch mechanism 36, a sleeve 133 loosely fits the reamer shaft in the space between the bearing sleeve 45 and an enlarged hollow upward extension 134 of the shaft, and suitable bearing washers, as 135, are arranged above and below said sleeve.

The lower portion of the enlarged hollow upward extension 134 is screw-threaded and a shouldered collar 136 slidably surrounds its upper end and is secured thereto, as hereinafter appears. A coil spring 138 is arranged between the shoulder on collar 136 and an adjustable screw-threaded split abutment 139 threaded on the shaft extension 134, and locked in adjusted position by suitable clamping screw 140. A second adjustable abutment 141, similar to the abutment 139 and similarly locked in place, is arranged to form an abutment against which the upper bearing washer 135 bears in the raising of the reamer.

The upper end of the hollow reamer shaft extension 134 is supported and guided for vertical movement by a tubular downward extension 142 from the hub 143 of the juice collector 144. This tubular extension 142 telescopes within the shaft extension 134, and they are connected to rotate together by a transverse pin 145, fitting aligned holes in the shaft extension and the collar 136, and passing through slots 146 in the diametrically opposite walls of tubular extension 142. The holes in the shaft extension are in the form of slots 146' permitting slight endwise movement of reamer and collar against the extension of the spring 138, thus permitting the reamer to automatically adjust itself to fruit having different thicknesses of skin.

The reamer 128 is detachably connected to rotate with the hub 143 and the reamer shaft extension 134 by having its stem 147, which may be screw-threadedly secured thereto, mounted to have a sliding fit in a central hole in the hub 143. The lower end of this stem is reduced in diameter and split longitudinally, see Fig. 18, the ends of the split portions being formed with opposed parti-circular recesses, which, when the reamer and its stem are forced downwardly, lock about the pin 145, due to the resiliency of the split portions of the stem. A tapered extrance is provided to permit the split portions to be forced apart and allow the pin to seat in the opposed recesses. Thus the reamer is securely locked to rotate with the shaft and at the same time is readily removable and replaceable, if desired.

The reamer may be raised and lowered from the cam 132 by a lever 148 pivoted at 149 on the main frame 16 and having on one arm thereof a cam follower roller 150 of spherical form guided in the cam groove on cam 132, and having its other arm forked at its end, the forked end being slotted to receive trunnions, as 151, on the sleeve 133 surrounding the shaft 25. The cam thus raises and lowers the forked end of the lever 148 and thereby not only moves the reamer to operative and inoperative positions, but in such movement also controls the clutch mechanism 47 to effect the drive of the reamer and collector.

To permit quick adjustment of the limits of movement of the shaft 25, the lever is preferably split into two parts 148a, 148b, each being pivoted at 149, and these parts are adjustable with respect to each other by a screw 152 and locked in adjusted position by a second screw 153.

Figure 22:
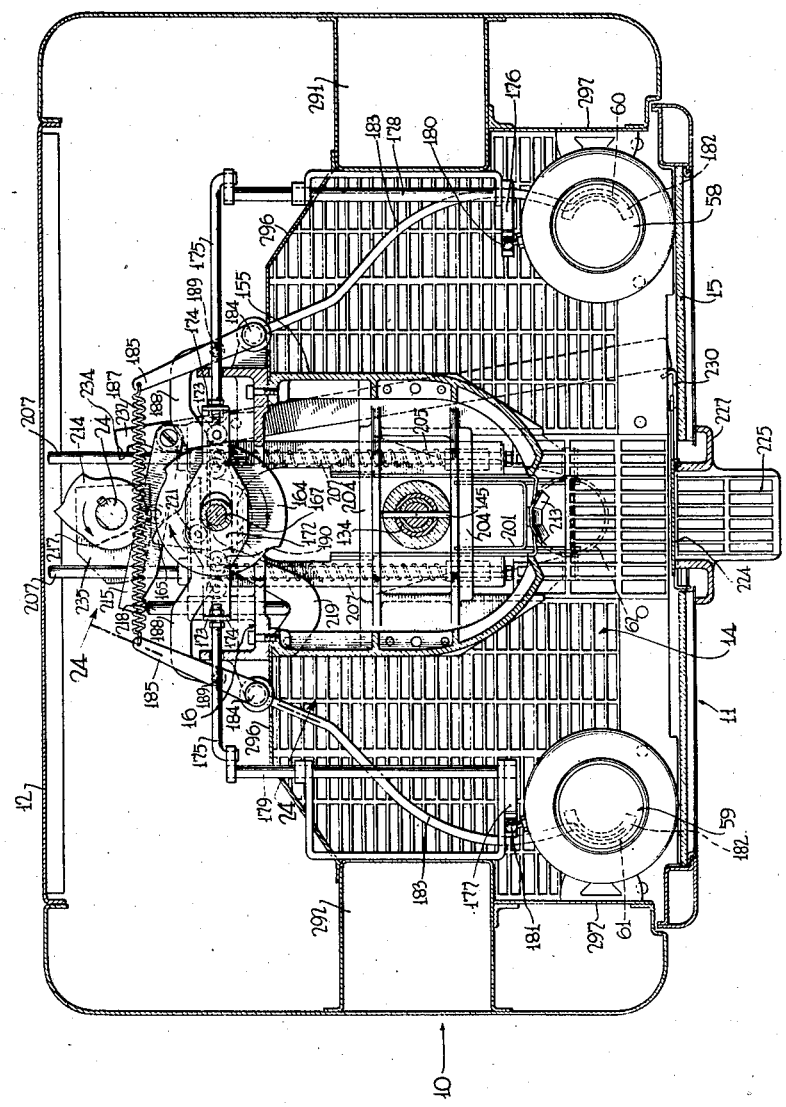
Fig. 22 is a sectional plan view through the machine taken substantially on the line 22—22 of Fig. 5, the parts being in the position of Fig. 12.

The hub 143 of the collector is supported for rotation by an anti-friction bearing 154 secured in a central opening in an auxiliary frame of casting 155 projecting from the front of the main casting 16, and suitably secured thereto as by bolts, see Figs. 22 and 26.

The reamer and collector or impeller housing 57 is seated through machined faces on the top of this auxiliary frame 155 being located by dowel pins and secured, if desired, by bolts, see Figs. 5, 18 and 31. Preferably for convenience in assembly and disassembly, the housing 57 is made in two parts, a lower part 156 having a bottom wall formed with an outwardly and downwardly inclined inside face and a cylindrical outer vertical wall opening at the front into the forwardly and downwardly projecting discharge spout 67, and an upper part 157 seated through a rabbeted joint upon the vertical wall of the lower part and extending upwardly and inwardly to the central opening through which the hands are adapted to project during the reaming operation.

To collect and impel the extracted juice to and through the discharge spout, the collector or impeller 144 is secured to rotate with the hub 143. This impeller may comprise a bottom plate 159 conforming in shape to the bottom of the housing 57 and securely clamped to the hub 144 by a clamping nut 160, and a top plate 161 conforming generally to the inside face of the top part 157 of the housing 57. The top and bottom plates of the impeller are interconnected at their outer peripheries by spaced struts or vanes 162, which may be, as shown in Fig. 26, of streamline shape in cross-section, and have their outer faces in loose contact with the inside of the vertical wall of the housing 57.

With this arrangement of impeller, it will be seen that, when the impeller is rotated, the juice falling on it is thrown out centrifugally to the outer wall of the housing and swept by the struts to and discharged through the spout 67. While the juice is being extracted, the hand seals the top opening in the impeller housing 57 and thus prevents any of the juice from being thrown out through said opening.

The reamer and impeller, by this arrangement, are driven at a low speed, say 300 R. P. M., when the reamer is in raised reaming position. This insures a better extraction of the juice without tearing the pulp from the skin, and avoids a too violent discharge of the juice through the spout. When the reamer approached its lowered position and after the most of the juice has been expelled through the spout, it is desirable to speed up the impeller to expel any juice or pulp still clinging to the parts of the housing and impeller. At this time, the clutch throws the impeller and reamer into high speed, say 1800 R. P. M., thus effectually cleaning the parts of such remaining juice. Finally, the complete descent of the reamer shaft applies the brake to stop the impeller and reamer and the entire machine.

*The empty cup dispensing and delivery mechanisms*

Referring now to Figs. 4, 5 and 22 to 25, the empty cup handling mechanisms comprise the right and left cup dispensers 58 and 59, and the right and left cup deliverers 60 and 61 already referred to in describing the machine generally. The right and left such devices are each arranged to deliver a cup in alternate cycles of the machine to the filling position under the spout 67. This is primarily to avoid excessive height in the cup dispensers and to enable the dispensers containing the desired number of cups to be accommodated in the height available between the lower transverse plate 14 and the bottom of the hopper 13.

The operation of all these devices, both right and left, may be controlled by a pair of peripherally-faced cams, the one, designated 164, for operating the cup dispensers and the other, designated 165, for operating the cup deliverers. As shown in Figs. 5, 18 and 23, these cams may be mounted in spaced relation, the one 165 on a hub 166 rotatable on the lower end of a stub shaft 167 paralleling the main cam shaft 24, the upper end of this shaft being received within a hole in a rearwardly-projecting boss 168 on the main casting and locked in place by a set screw, (not shown).

Also rotatably mounted on this shaft 167 and carrying the cam 164 clamped between its hub and the hub 166 and locked to the latter by an end spline and groove connection 169 is a gear wheel 170 which meshes with a smaller gear 171 splined to the cam shaft 24. The ratio between these gears is 2 to 1, which gives the cams on the stub shaft 167 one half revolution for each full revolution of the main cam shaft 24, corresponding to a cycle of the machine.

The cam 164, see Fig. 22, has a uniform radius high portion for substantially half its circumference, merging with a uniform radius low portion for substantially the remaining half. A slotted plate 172 receiving the hub 166 in the slot, rests on top of the cam and is provided on its lower face with two cam follower rollers 173 which are spaced so as to normally be in engagement with the diametrically opposite sides of the cam. The ends of this plate 172 have ears 174, through which the ends of the plate are connected by rods 175 to right and left-hand cup dispenser operating levers 176 and 177, pivoted on long rods 178 and 179 extending from the rear of the machine to the dispensers, see Fig. 22.

The dispensers shown are of the type in which the pulling of a lever arm in one direction separates the lowermost cup from the remaining cups, and the return of the lever permits the cup to drop from the bottom of the dispenser. Since the dispenser lever arms 180 and 181 both point in the same direction and are connected, respectively, to the operating levers 176 and 177, it will be seen that the reciprocation of the plate 172 by the cam will, in one direction of movement thereof, operate the dispenser arms 180 and 181 to free the lower cup from the rest, and in the opposite direction of movement, positively release a cup from each dispenser to drop down to the platform 14.

In the instant case, each cup deliverer comprises a curved cup-receiving portion 182 normally in position under a dispenser to receive a cup dropped therefrom in front of said curved portion, the portion 182 being secured by a curved rod 183 or the like to the hub 184 of a lever 185 pivoted on a stud pin 186 secured to a boss extending from one side of the main frame 16, see Fig. 25. The levers 185 have their remote ends connected by a tensioned spring 187, which constantly tends to swing both levers and the curved cup-receiving portions to the position shown in Fig. 22.

The cam 165 is connected to the levers 185, in each case by a bent link 188 pivoted to the respective lever intermediate its length as by a pivot pin 189. see Figs. 24 and 25, the opposite end of the link being slotted and straddling the hub 166 of the cam 165. The slotted ends of the respective links are guided for sliding movement on the hub, one just above and the other just below the cam, and each is provided with a roller cam follower 190 engaging the edge of the cam. This cam has an abrupt raised portion on one side, which alternately engages the rollers 190 associated with the respective cup deliverers to move a cup from its position under a dispenser to a position under the spout 67. By this arrangement, since the cam 165 rotates at half the speed of the main shaft 24, a cup will be positively delivered to the spout, alternately, from the cup dispensers in the successive cycles of the machine.

*The strainer and refuse chute and cup push-out mechanism*

In the spout 67, Figs. 5, 18, 26 and 27, is provided a strainer 191 for catching the seeds and other refuse discharged with the juice, this strainer comprising a series of closely spaced parallel pins passing through holes in the front wall of the spout and secured at their outer ends to a rod 192 pivoted at its ends in the lower ends of the side walls of an inwardly-facing channel-section hanger 193. This hanger is pivoted by a pin 194 to a forwardly projecting bracket integral with the spout 67. The channel-section hanger 193 not only conceals the strainer and bracket from the front of the machine but also serves, when swung on its pivot, to move the strainer pins into and out of operative relation to the inside of the spout.

As shown in Figs. 18, 26 and 27, one side of the hanger 193 is pivotally connected to an operating rod 195 which passes to the rear of the machine through holes in the castings 155, 16 and is connected to one end of a lever 196 pivoted on a vertical pin 197 which may be, as shown, a reduced upward extension of the stub shaft 167 mounted on the rear face of the casting 16. This lever 196 has a cam follower projection 198 in operative relation to the peripheral surface of a cam 199 splined to the main cam shaft 24 and located longitudinally of the shaft by sleeve spacers between it and the left-hand operating cam and the gear 171, see Fig. 5. A tension spring coiled about the pivot pin 197 and bearing at one end against the main casting 16, and at the other end secured to the lever 196, always urges the follower toward the cam face.

This cam has a high portion through a small arc thereof, which, when it passes the follower, operates the strainer outwardly to clear the chute and scrape off any refuse collected thereon and allow this refuse to drop down through the bottom of the chute. At all other times the strainer is maintained in operative position with the pins in the chute, see Fig. 18, by the tension of spring 200. When this release of the refuse by the strainer takes place, a generally vertically disposed refuse chute 201 normally in position behind the spout, as in Figs. 5 and 18, has been moved forward under the spout, as in Figs. 29 and 30, so that the refuse is guided down through the chute into the bottom of the machine.

The refuse chute may be of rearwardly open channel section, see Figs. 29 and 30, mounted for fore and aft swinging movement in a slot in plate 14 and between the curved side walls of the auxiliary casting 155. It is pivoted on a pin 202 at its lower end and forwardly of its forward wall, this pin passing through spaced forwardly-extending portions of a separate casting 203 which provides a connection between the lower portions of the side walls of casting 155, see Fig. 31, and is secured thereto, as by dowels and bolts. The plate 14 has its adjacent margins secured between the castings 155 and 203, see Fig. 31. As shown in Fig. 29, the casting 203 is roughly U-shape in plan, and it is between the forward ends of the U that the refuse chute is pivoted. In the bight of the U is located the composite reamer and impeller shaft, and on the front and rear sides of this shaft the sides of the U are interconnected by arched bridging portions 204, see Figs. 29, 30 and 31.

The cup push-out and the means for operating it are mounted for the most part on this casting 203. It (the cup push-out) comprises as one of its main elements a sheet metal slide 205, also of generally U-shape in plan, the bight of the U being at the rear of the machine and the legs of the U, designated 206, extending forwardly. The slide 205 is mounted just below the platform 14 on a pair of rods 207 fixed at their rear ends in the main casting 16 and at a point intermediate their ends in ears 208 on the side of the U-shaped casting 203. Coil springs 209 are threaded on these rods and have their ends bear, respectively, against the rear vertically extending wall 210 of the slide 205 and the rear faces of the ears 208. These springs tend to move the slide 205 to its rear position at all times, as shown in Figs. 5 and 22.

As shown in Fig. 30 and at the left in Fig. 31, the legs 206 of the U-slide 205 are provided intermediate their ends with upwardly projecting ears 211 extending above the platform 14 and to these ears are secured as by welding the forwardly extending arms 212 which carry at their forward end a cross-connecting portion which in turn supports a rearwardly inclined and transversely concave cup push-out proper 213. The inclination and transverse concavity enable the push-out to approximate the shape of the cup, as 62, with which it cooperates.

In Figs. 29 and 30, the cup push-out is shown in full lines in its extreme forward position in which it delivers a cup to the outside of the machine casing and also (in dotted lines) in a slightly withdrawn position within the casing, a position which it holds at the start of the machine.

The cup push-out is actuated to its outer positions against the tension of the springs 209 by a cam 214 splined to the main cam shaft and operating through a motion-multiplying system of levers upon the slide 205.

This system of levers may comprise a primary lever 215 pivoted at one end at 216 on a rearwardly extending bracket of the main frame casting 16 and carrying intermediate its ends a roller cam follower 217 cooperating with the cam 214. The opposite end of this lever engages a rod 218 slidably mounted in a bracket of the main casting 16, which rod has its inner end in engagement with a secondary lever 219 of angular form having arms of unequal lengths. This lever is pivoted at 220 at the end of its short arm adjacent to which the rod engages the long arm. The long arm of the lever carries a roller 221 at its free end which engages the rear wall 210 of the slide 205. From this arrangement it will be seen that a relatively small rise in the cam will produce a multiplied movement of the slide 205 and consequently of the push-out proper 213.

The movement of the push-out also controls the movement of the refuse chute 201. As the push-out proper 213 is returned to its inner position from the position of Fig. 30 to the position of Fig. 20, it engages the front wall of the chute and pushes it back against the tension of the coil spring 222, which is a very much lighter spring than the springs 209, so that the latter easily overcome the tension of the former in this movement. Similarly, the chute, under the action of its spring 222, is caused to follow the outward movement of the push-out proper 213 until it reaches the position shown in Fig. 30 under the spout. Here it may be stopped by stop shoulders 223 from its side walls striking the front margins of the side walls of the casting 155.

As shown in Figs. 29, 30, 32 and 33, a gate 224 normally closes the opening through which the cup is pushed out upon the platform 225, this gate being hinged on the bolt 226 screwed into the rear face of the gate frame casting 227 adjacent the bottom of the opening, the inner face of the casting around this opening being machined flush with the face on which the gate is pivoted so that the gate fits flat against the said faces and can be moved around its pivot to the dot-and-dash line open position shown in Fig. 32. The gate is normally held closed or moved to closed position by a coil spring 228 surrounding a rod 229 mounted to slide in an inwardly projecting lug in the casting 227, one end of the rod being connected to a slide 230 mounted and guided for sliding movement along the inside face of the casting.

The spring is connected to move the slide 230 toward the right as shown in Figs. 32 and 33. The gate has a projection beyond its pivot having an angular slot, in which engages a pin 231 on the slide 230. The gate is thus held closed when the slide is forced by its spring to locate the pin in the horizontal left-hand end of the slot, as shown in Fig. 32.

This yielding movement of the gate to closed position is desirable to avoid possible injury to the hand, should a finger be projected through the opening while the gate is moving to closed position. If the gate were positively operated to closed position, the finger might be seriously cut.

Figure 3:
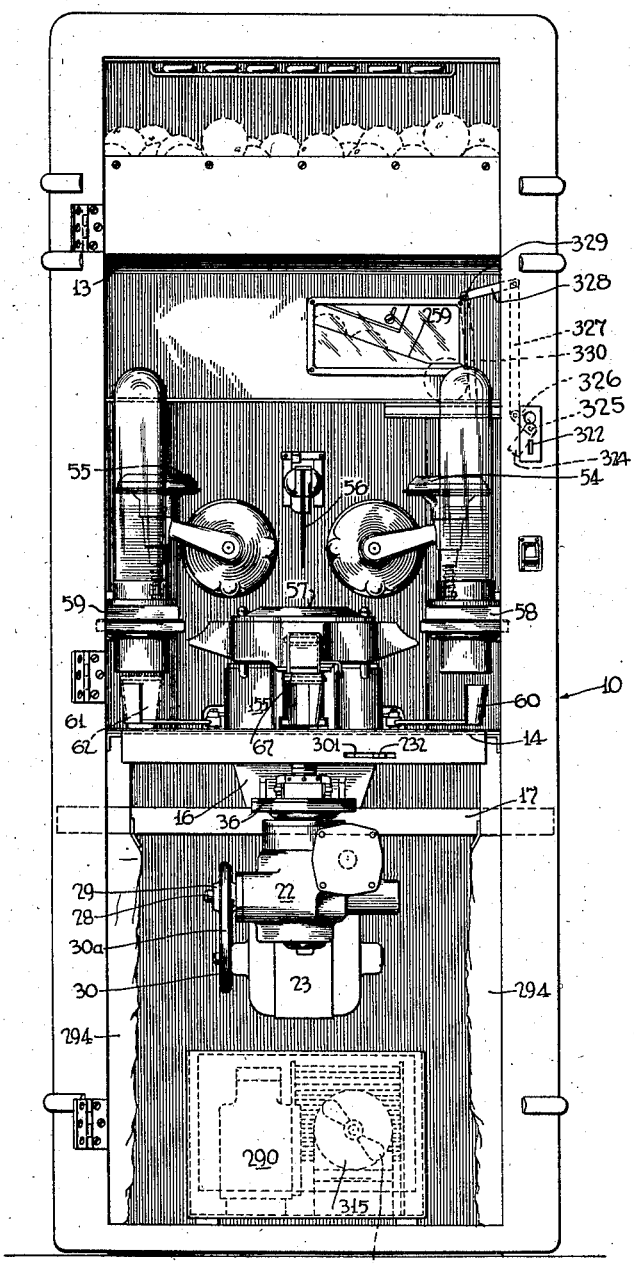
Fig. 3 is an enlarged front view of the machine with the door open showing the general arrangement of the parts of the machine inside the cabinet.

The gate is, however, positively moved to open position through a lever 232, see Figs. 29, 30 and 33, having its forward end, which is supported in a slot 301 in a depending flange from partition 14, see Fig. 3, engaging the end of the slide, this lever extending to the back of the machine through a hole in the casting 16 and being pivoted at 233, see Fig. 29, on the casting 16. The short end of this lever is formed with a cam follower 234 arranged in the path of a cam 235 splined to the cam shaft 24 directly below the cam 214, see Fig. 5, and between it and the reamer-lifting cam 132. The high point of this cam 235 positively moves the gate through the lever 232 and slide 230 to open position and holds it open long enough for the cup push-out 213 to push out the filled cup and be withdrawn inside the opening.

The platform 225 outside the machine cabinet has, like the platform or partition 14 inside the casing, an open or reticulated top through which any juice spilled from the cup 62 may readily pass and be led by an inclined chute 236 to a suitable receptacle for refuse 237 provided in the lower part of the machine cabinet. Below the platform, the casting 227 frames an opening, normally closed by a door 238, see Figs. 5 and 32, hinged at the top and held closed by a spring 239. This door can be readily pressed aside to permit the empty cup to be passed through to drop into the refuse receptacle 237.

*The hopper and fruit-feeding mechanism*

Figure 34:
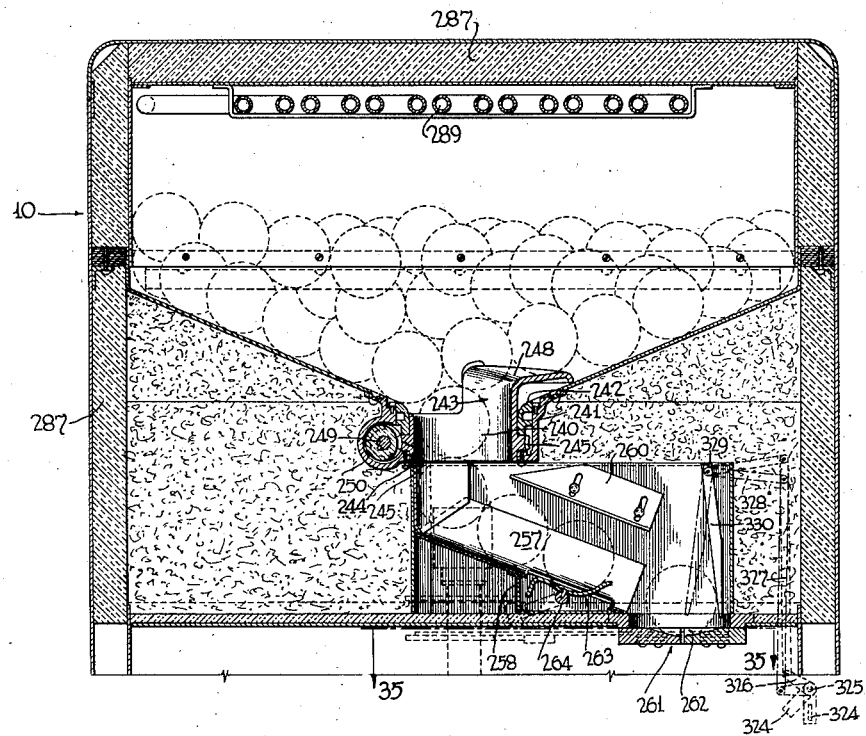
Fig. 34 is a vertical sectional view through the top of the machine including the hopper, the section being taken through the feed chute leading from the hopper and the discharge gate.

The hopper chamber for receiving a supply of fruit has its bottom conical wall 13 inclined to central opening 240, see Figs. 6 and 34, so that the fruit moves by gravity toward said opening. An annular bearing is inset in this central opening, the bearing comprising an outer member 241 and an inner member 242, these two members being secured together and to the wall surrounding the openings by screws or the like. Within the bearing is mounted an agitator 243 having a ring bearing 244 rotatable within the annular bearing 241, 242, and from the outer face of this ring projects a worm gear 245. The opposite faces of the worm gear serve to hold the agitator vertically in place, being disposed between horizontal faces of the outer and inner bearing members.

Figure 36:
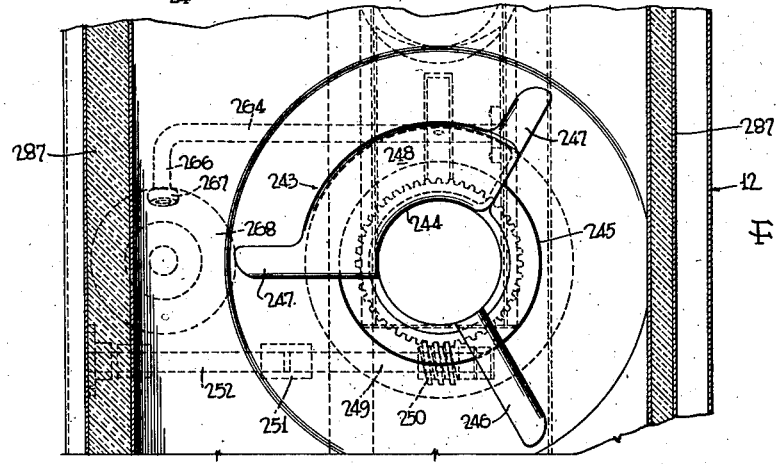
Fig. 36 is a detail sectional plan view of the agitator and associated parts.

The agitator has three arms, as seen best in the plan view, Fig. 36, disposed substantially 120 degrees apart. One arm 246 extends freely from the bearing ring and is disposed along and conforms to the conical hopper bottom. The other two arms as 247 extend similarly, their outer ends being free but their inner portions having connected thereto a segmental portion provided with an inclined upper face 248 rising from the floor of the hopper to a point some distance thereabove, and there terminating in a vertical face, see Figs. 6 and 34. The agitator keeps the fruit in the hopper from jamming at the opening, the arms and inclined surface breaking up any tendency to jam during the rotation of the agitator and causing the fruit to pass down through the opening.

The agitator is rotated by a fore and aft worm shaft 249 carrying a worm 250 meshing with the worm gear 245. The worm shaft is supported by suitable bearings from the outer annular member 241. A coupling 251 connects the rear end of the shaft 249 to the inner end of an aligned shaft 252 carrying at its outer end adjacent the rear wall of the cabinet a sprocket gear 253. Inwardly of this gear the shaft is supported by a wide bearing on a bracket 254 secured to the rear wall of the cabinet.

Substantially vertically aligned with the shaft 252 and sprocket gear 253 in the lower portion of the machine, see Fig. 4, is the shaft 31, driven at reduced speed from the motor, the reduced rear end of which projects from the gear casing 22 and carries the sprocket gear 255. The two sprocket gears are connected in driving relation by a sprocket chain 256. Thus it will be seen that the agitator is rotating at all times when the motor 23 is operating.

An inclined sheet metal feeding trough 257 is secured at one end by lateral flanges, see Fig. 6, to the bottom of the bearing ring 241 and supported intermediate its ends by a bracket 258 and at its opposite end directly from the extreme bottom of the hopper chamber. The front wall, Fig. 3, of the feed trough is of less height than the diameter of a fruit, so the fruit can be seen feeding down the trough when the front door is open. If desired to have the operator see the fruit feed, a small window (not shown) may be provided in the front door 11 opposite the trough.

The top of the trough may be formed by an adjustable plate 260, adjustably secured to the rear wall of the fore and aft passage containing the trough. The purpose of the adjustment is to allow fruit of different sizes to be fed without piling up in the trough.

From the bottom of the trough, the fruit rolls upon the discharge gate 261 and comes to rest in a depression 262 in the gate. To insure the feeding of but one fruit at a time to the gate, a one-at-a-time release mechanism or trip is provided in the trough.

This release mechanism may comprise, as shown in Fig. 34, a bent strip of metal or release trip 263 secured intermediate its ends on a transverse pin 264 mounted adjacent the bottom of the trough, said trip adapted to have its opposite ends projected into the trough in the path of the fruit being fed. The forward arm of this trip is bent upwardly and the rear arm downwardly, and when it is locked in the position shown in Fig. 34, it prevents the feed of a fruit to the gate. When released, the weight of the fruit causes it to swing on its pivot to project its rear arm in the path of the succeeding fruit and prevent its downward movement in the trough, until the rear end of the trip is again swung down and the front end raised as shown in Fig. 34, when the next fruit feeds down and comes to rest against the upwardly inclined front arm of the trip.

The trip is controlled to feed a fruit to the gate at each cycle of the machine by having its pivot pin 264 extended rearwardly through the top of the main casting 16 and there supported in a wide bearing 265, see Fig. 6. At its rear end it has a laterally extending arm 266 slightly offset downwardly from the axis of the pin 264, and carrying a cam follower roller 267. This roller engages the under face of a cam 268 splined to the main cam shaft 24 and bears against an annular face of said cam. A spring 269 may hold the cam follower against the cam. This cam normally maintains the trip for most of the revolution of the shaft in the position of Fig. 34 but releases it to turn and release the fruit resting against its foremost arm when the roller drops into a low portion of the cam. After the release, the cam immediately restores the trip to its original position allowing the next fruit to move down and rest against the raised fore arm of the trip.

Figure 35:
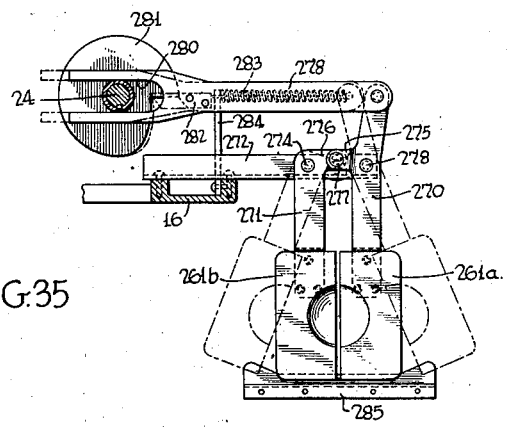
Fig. 35 is a detail plan view of the fruit discharge gate and its operating mechanism.

Referring now to Figs. 6, 34 and 35, it will be seen that the discharge gate 261 comprises two similar parts 261a, 261b, the line of separation between the parts passing through the center of the depression 262 in which the fruit rests on the gate. These gate parts are mounted so to permit them to move to a separated position to permit the fruit to drop between and come to rest in the right hand 54, located directly below, Fig. 7.

The mechanism for so moving the gates may be in the nature of a scissors movement, the gate parts 261a and 261b being connected, respectively, at one of their ends to straps 270 and 271 which are pivotally supported, respectively, by a bracket 272 secured to the casting 16 and projecting laterally therefrom. They are pivoted to the bracket, respectively, by pivot pins 273 and 274 and have short arms 275 and 276 extending toward each other and pivoted together at 277, the pivot holes being preferably slightly elongated to avoid binding.

One of the straps as 270 has an extension rearwardly beyond its pivot and this extension is pivotally connected to a link 278, which link has its opposite end bifurcated to straddle the cam shaft 24 and is guided by an annular groove 280 on the shaft just above the cam 281 splined to the shaft 24. A cam follower 282 projects downwardly from the link in position for engagement with the peripheral face of the cam 281. A tension spring 283 secured at one end to the link and at the other end to a bracket 284 projecting rearwardly from the casting 16 holds the follower against the cam and, since the follower rests on a high portion of the cam during the greater portion of the revolution of the cam shaft 24, the gate will be held closed, as shown. A sudden drop is provided from the high point of the cam, and when this is reached, the spring acts to swing the gate to open position, see dot-and-dash lines in Fig. 35, permitting the fruit to drop into the hand.

The free ends of the gate parts 261a and 261b are supported and guided by an angular support 285 secured to the bottom of the outer face of the fore and aft passage in which the trough is located.

This fore and aft passage, except for the opening at the front, which may be closed by a glass panel 286, see Fig. 3, is insulated as are all the walls of the hopper as well as the gate by a thick insulating layer 287. Where the door 11 closes against the opening for charging the hopper with fruit, the door also is so insulated, and surrounding said opening it is provided with a sealing gasket 288. Thus the walls of the hopper and feed trough are well insulated throughout so that the fruit in the hopper may be kept at the proper temperature.

To cool the inside of the hopper and feed trough and the fruit therein, a flat cooling coil 289 may be secured to the top wall of the hopper so as to interfere least with the storage space and the movement of the fruit toward the discharge opening. This cooling coil may be connected with a small motor-driven refrigerating unit 290 preferably located in the bottom of the cabinet, see Fig. 3, the motor for running this unit being controlled by a thermostatic switch to maintain the temperature in the hopper substantially constantly at the desired value.

Refuse disposal

As shown in Fig. 22, rectangular chutes 291 and 292 are arranged at the opposite sides of the cabinet to receive the ejected skins and to guide them down into the lower division of the cabinet below the plate 14. As shown in Figs. 3 and 6, these chutes extend from about the level of the fruit discharge gate 261 down some distance below the plate 14. At their inner sides, as shown at 293, in connection with chute 291, they are provided with rectangular openings through which the skins are ejected by the hands into the chutes. At their lower ends, Fig. 3, they may discharge into bags, as 294, which can be removed from time to time and emptied or can be replaced by new bags. The refuse from the strainer passing through the refuse chute 201 may be caught and guided into the container 237 by an inclined extension 295 projecting under the chute 201, Fig. 5. The used cup is disposed of in the manner already described; namely, through the door 238 into the receptacle 237. Like the bags 294, the receptacle 237 is readily removable from the cabinet for cleaning or replacement.

If desired and to avoid frequent cleaning of the receptacles receiving the refuse, as would be desirable to avoid objectionable odors caused by the fermenting of the refuse if left in the receptacles, these receptacles may be in the form of water-proofed paper or other bags, see Fig. 3, which can be readily replaced at small cost and the used ones collected by the man serving the machine, and destroyed.

Interior trim and ventilation

To mask the casting 16 and other parts in the intermediate portion of the cabinet visible through the window in the front door, the rear portion of the cabinet, as shown in Figs. 5 and 22, is closed off by thin metal sheeting 296 secured at the sides to the rear portions of the chutes 291 and 292 and centrally to the front face of the casting. As shown in Fig. 23, this sheeting may be omitted where the parts are hidden in any event, as in the region under and in back of the auxiliary or reamer-supporting casting 155. Other metal sheets, as 297, close the spaces on the opposite sides of the machine between the margins of the door opening and the adjacent chutes 291 and 292, respectively.

The parts visible from the outside of the machine through the window opening are prefer- ably treated to present a pleasing appearance, either by plating or painting in pleasing hues, and also to prevent tarnishing by any juice which may be spilled on them.

To provide for the ventilation of the cabinet exclusive of the top or hopper compartment, a lower grille-protected air-intake opening 298 may be provided adjacent the bottom of the rear wall of the cabinet, see Fig. 2, and another similar air-outgo opening 299 may be provided in the top portion of the removable rear panel 12. To insure the air circulation within the cabinet, a suitable motor-driven fan 300 located just inwardly of the bottom opening may suck the air in through the lower opening and drive it toward the front of the machine. The fan on the refrigerating unit 290 for blowing air over the condenser may serve this second function of circulating the air through the cabinet. From the bottom of the cabinet some of the air may flow upwardly through openings in the plate 14 and the various vertical chutes, and find its way out at the top between the top of the sheeting 296 and the top cross-member 21 to which the top of the casting 16 is secured in bodily spaced relation, see Figs. 5 and 6. Some of the air from the bottom may flow upwardly in rear of the casting 16 and sheeting 296 and between these parts and the rear wall of the cabinet. In either case, it will finally flow out through the out-flow opening 299 at the top of the cabinet.

Such ventilation is very desirable to keep the air within the cabinet pure and sweet. The general direction of the air-flow is indicated by arrows in Figs. 5 and 6.

The electrical control system

As shown by the wiring diagram of Fig. 38 and Figs. 3 and 4, the electric control of the machine is adapted for an alternating current 220 volt system, but it will be understood that with suitable changes any other system could be used. A length of cable, as shown in Fig. 2, may lead from the rear of the machine and be provided with a plug to plug the machine into any usual wall plug, or the like. In the diagram, the two feed lines are indicated by numerals 302 and 303 and the grounded neutral line by 304. The driving motor 23 is connected across the lines 302 and 303 by a line 305 which is normally open when the machine is idle but is closed by the automatically operated switch 306 when the machine is operating.

To close the automatic switch 306, the line 307, including the switch-operating coil 308 for operating the switch, is connected across the lines 302 and 303. This line 307 is divided into two parallel lines 309 and 310, each including a switch which is normally open. The switch 311 in line 309, which may be denominated the starting switch, is closed to energize the solenoid 308 to close switch 306 and thereby energize the motor 23 by a suitable coin-controlled mechanism (indicated by the coin 312), this mechanism acting to close the switch either directly or through a relay circuit in any well-known manner. The switch 313 in the other parallel line 310, which may be denominated the stopping switch, is opened and held open at the end of a cycle of the machine by a cam 314 on the cam shaft 24, shown in Fig. 4 secured to the reamer-lifting cam 132. The starting switch 311 is held closed by suitable delayed-action means until the cam 314, after the start of the motor and slight rotation of the cam shaft, moves out of operative relation to the switch 313 and the switch automatically closes. Before the cycle of the machine is complete, the starting switch 311 will have opened, and when the cam 314, after a full revolution of the shaft 24 and the completion of the machine cycle, again opens the switch 313, the motor is stopped and the brake applied, promptly stopping the entire machine.

The motor 315, Figs. 1 and 3, for the refrigerating unit 290 may also be connected across the lines 302 and 303 by a line 316 which is controlled by a thermostatic switch 317, associated with the hopper. The lights for lighting the inside of the machine while it is running may also be continuously energized while the motor is running. To this end, a line 318 is connected across the feed lines 302 and 303, having a suitable lamp 319, such as a neon lamp, in series and also a switch, as shown, forming a part of the two-pole switch 306, so that the lamp circuit is closed and opened simultaneously with the circuit to motor 23.

In order to attract attention to the machine, its interior may be intermittently illuminated, even when the switch 306 is open, through the by-pass line and flasher switch 321, which latter intermittently closes the by-pass line circuit between the feed lines in a well-known manner. It will be understood that the light circuit 318 may also be controlled by a manually operated switch (not shown) inserted in the circuit at a convenient location.

The operation of the machine

The operation of the machine will now be briefly described. The machine connected in a suitable current supply circuit having been charged with fruit, such as oranges, and a fruit, as F, being located on the release or discharge gate 261, a coin, as 312, is dropped in the coin slot 322 at the right side of the front of the machine, see Fig. 3.

This operates through a suitable coin-control mechanism (not shown) located inside the machine to close the starting switch 311, which in turn effects the close of the driving motor circuit to start the motor.

Figure 37:
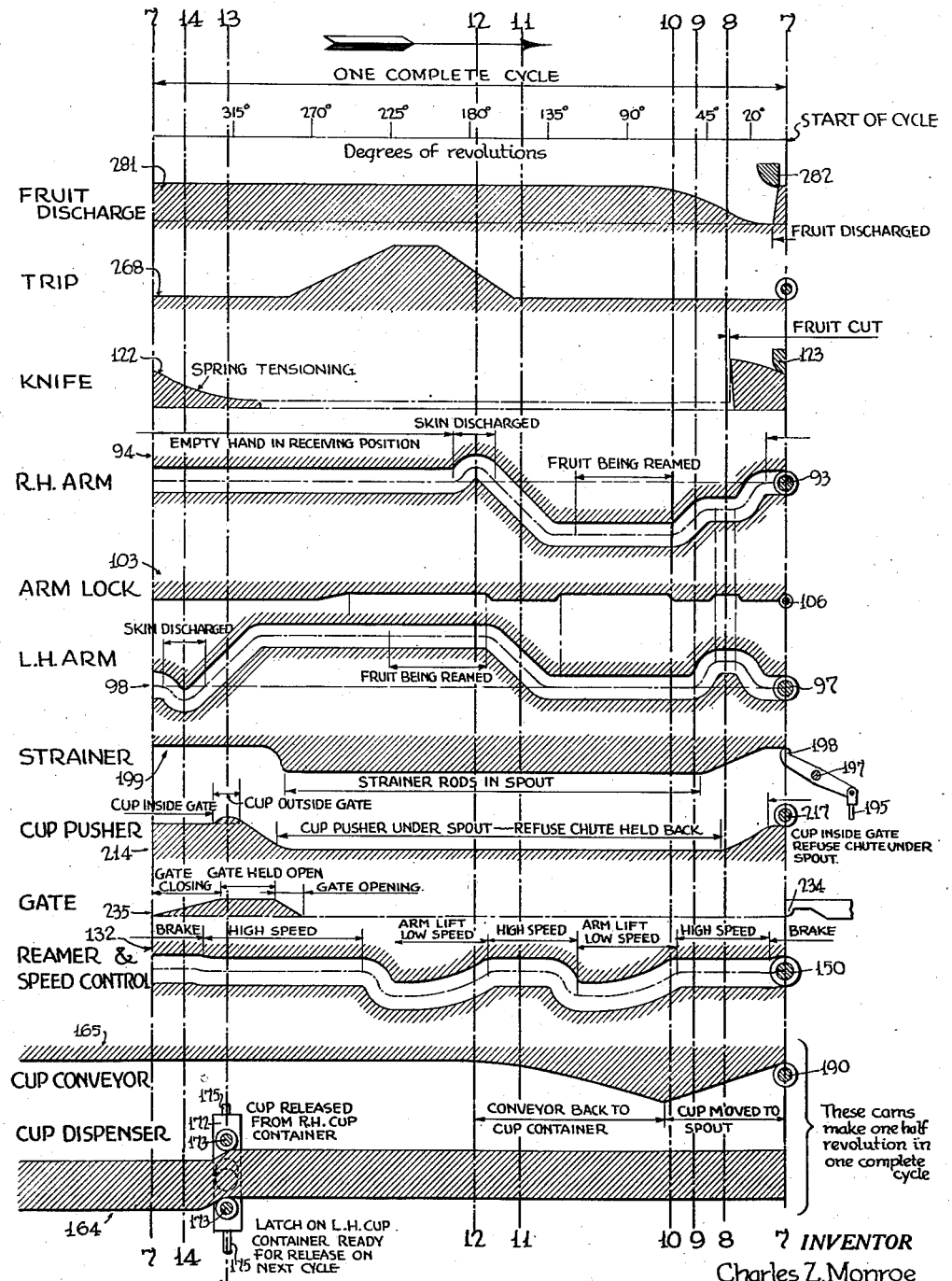
Fig. 37 is a timing chart showing the timed relation of the various operating mechanisms for a full cycle of the machine.

By reference to the timing chart of Fig. 37, showing a development of the cams during a complete cycle (that is, a complete revolution of the cam shaft), and Figs. 7 to 14, showing the approximate successive positions of the principal parts of the machine visible through the window in the front door, which positions are indicated in the timing chart by the vertical dot-and-dash lines designated by numbers corresponding to Figs. 7 to 14, line 7—7 at the right indicating the parts in the starting position, it will be seen that, immediately after starting, the fruit release or discharge gate is operated by the release of its cam follower 282 from the high point of its cam 281. The release gate opens and the fruit, as indicated in dotted lines in Fig. 7, drops down and is gripped by the right hand 54.

Further rotation of the cam shaft 24 brings the parts to the next position shown in Fig. 8, indicated on the chart by line 8—8. It will be seen that the hands 54 and 55 have been moved toward each other, where both grip the fruit, by their respective cams 94 and 96 and the respective cooperating cam followers 93 and 97. The knife 56 has been released to cut the the fruit in two, by its cam follower 123 dropping off the high point of the cam 122, and the locking plungers 100 have been projected by their springs 101 into the holes 102 in the casting 18 to lock the hands against rotation under the thrust of the knife, the cam 103 permitting this by reason of a low point in this part of the cycle. At the same time, the strainer 191 is being allowed to return by its cam 199 and cam follower 198 to its operative position, and the cup push-out 213 and refuse chute 201 have been allowed to return to their rearward position by the cam 214 and its follower 217. The left cup deliverer or conveyor 61 has started to move its empty cup from the left dispenser 59 toward the central location under the spout by reason of its cam follower 190 riding up the high point of the cam 165.

The reamer shaft 25 has been slightly raised, through its cam 132 and cam follower 150, from its lowermost braking position indicated at the starting position to a position where it and the impeller or collector 144 are driven at high speed from the high-speed shaft 37.

In the further rotation of the cam shaft to bring the parts to the position of Fig. 9, the hands are both rotating, after a brief dwell at the cutting position, as shown in the diagram, by the incline of their cams at this location, the right hand toward the reaming position and the left hand toward its starting position. Before the commencement of this rotation, the locking cam has pressed back and thus released the engagement of the locking plungers with their holes. The cup deliverer 40 has fed the cup near the spout 67.

The further rotation of the cam shaft to bring the parts to the positions of Fig. 10 has resulted, as indicated by the timing diagram, in bringing the right hand to the reaming position, where it has an appreciable dwell. The reamer has started to rise to cooperate with the hand to extract the juice, as indicated by the dip in its cam 132. It and the collector or impeller are now disconnected from the high-speed shaft 37 and connected to the low-speed shaft 38. The left-hand cup deliverer has almost reached its position placing the cup under the spout. The strainer rods are in operative position in the spout, and the locking plungers are free to the action of their springs to lock the right hand in the reaming position during reaming.

In the rotation of the shaft to position the parts as Fig. 11, the hands are again rotating but now in the opposite direction from that shown in Fig. 9 due to the opposite slope of their cams, and the reamer has returned to its lowered position where it and the impeller are again driven at high speed. In this position, the impeller or collector is spun at high speed to discharge the remaining juice cleanly by centrifugal action. The left conveyor or deliverer is nearing its position under the left dispenser.

In the further rotation of the shaft to position the parts as in Fig. 12, the left hand has been moved to and is dwelling in the reaming position, while the right hand has been swung beyond the starting position to the ejecting position, with the stem 63 of its ejector 72 in engagement with a lateral abutment 65 on the reamer housing, and in the act of ejecting the skin (see dotted lines) through the opening 293 into the vertical chute 291. The reamer has been raised slightly to change from the high-speed drive to low-speed drive during the reaming. The locking plungers are again released to lock the hand during reaming. The trip is being operated to release the next fruit to descend onto the discharge gate.

In the further rotation of the shaft 24 to position the parts as in Fig. 13, the right hand is returned to its original position where it remains during the rest of the cycle ready to receive a fruit on the next cycle. The left hand is rotating toward the ejecting position and indicated by the downward incline of its cam, at this location. The reamer has been raised for the reaming operation and again returned to its lowered high-speed position, as indicated by the dip in the cam, and is maintained at this high speed for some time to thoroughly clean the collector. Before the completion of this high-speed cycle, the strainer is opened to allow the last particles of refuse to be thrown through the spout, and the rush of the air caused by the rapidly rotating impeller to thoroughly clean the spout of all refuse. The gate 224 at the front of the machine has been opened and is held open by the rise in its cam 235 operating on its cam follower 234. The cup push-out has moved the filled cup forward to the platform on the outside of the machine as indicated by the rise in its cam. In this position, the cam 164 for operating the cup dispensers as indicated by its slope is about to actuate the dispensers to release a cup from each.

In the next position of Fig. 14, the left hand has been moved to its extreme ejecting position as indicated also by the extreme low point in its cam, the gate is moving to closed position, the cup push-out has moved back inside the cabinet at the starting position of the cycle, and the refuse chute remains positioned under the spout where it was moved by its spring 222 during the outward movement of the cup pushout.

The shaft has now made almost a complete revolution which corresponds to a machine cycle. In the further slight rotation, the left hand is returned to starting position, shown in Fig. 7, the gate 224 is moved to completely closed position, and the strainer is still held open by its cam. In this last part of the cycle, the reamer is again depressed to its lowest position in which the brake is applied to stop the machine.

Adjacent the end of the cycle of operation, the stopping switch 313 is opened by the cam 314 on the shaft 24, thereby opening the driving motor circuit while the brake is being applied to insure the stopping of the shaft 24 before the cam 314 again releases the switch 313 to closed position.

The machine is now in condition to repeat the cycle of operation, when a coin is again dropped in the coin slot.

As shown in Figs. 3 and 34, the machine may be provided with a device protecting the customer against the loss of a coin if no fruit is in position over the discharge gate 261. To this end a coin-slot closing plate 324 (shown in both operative and inoperative positions in Fig. 18 and in inoperative position in Fig. 3) is provided for closing the slot, so no coin can be inserted under the above conditions. This closing plate may be rigidly secured to a shaft 325 suitably pivoted in the cabinet, this shaft having secured to it an arm 326 extending at right angles to plate 324 and connected by a vertical link 327 to an arm 328 on a shaft 329, to which is secured an arm 330 which normally, under the action of gravity of the parts connected to it, is projected into the path of a fruit above the gate 261 as shown in dotted lines, Fig. 34. When so projected, the coin slot is closed by the plate 324. However, when a fruit is fed into position over the gate 261, it pushes aside the arm 330 to the full-line position, Fig. 34, and this acts through the link and lever connection described to operate the coin-slot closing plate 324 to open position, as shown in Fig. 3 and in one of the dotted-line positions thereof in Fig. 18.

While the machine has been described herein as a full-automatic machine adapted to be operated by a coin-control to process one fruit at a time at each dropping of a coin in the slot, and delivering the juice from said fruit to the customer without any hands having touched it, it is obvious that the main operations and their controlling mechanisms could be used in a machine which was but partly automatic in operation. Such means as the fruit feed and the cup delivery to the outside of the closed locked cabinet might, in some conditions of use, be entirely dispensed with, as where the hand to which the fruit is fed and the cup position under the spout were made accessible by removing parts of the cabinet, or otherwise, and under such conditions the fruit might be fed to the cup by hand and the cup picked up from under the spout by hand and the machine started by a manual switch. Other and further modifications and variations will readily occur to one skilled in this art, and all such modifications and variations as fall within the spirit and scope of the invention in its broad aspects are intended to be included in the combinations and sub-combinations defined in the appended claims.

What I claim is:

1. In a fruit juice machine, a reamer and means for rotating it, a pair of fruit-gripping hands, each rotatable on an axis, the hand axes being parallel and lying in a plane which is at right angles to the axis of the reamer and said hands rotating substantially in a plane containing said reamer axis, means for rotating said hands to bring them successively in line with the reamer axis, and means for causing relative approach and separation movements between the reamer and each hand when so aligned for extracting the juice from the fruit gripped by the hands.

2. In a fruit juice machine, a centrally arranged vertical reamer shaft, a reamer carried thereby, means for rotating said reamer shaft, a pair of fruit-gripping hands mounted on horizontal axes one at each side of the reamer shaft, means for rotating said hands to successively align them with the reamer shaft, and means for causing a relative approach and separation movement of the reamer and each hand when so aligned to extract the juice from the fruit gripped by said hand.

3. In a fruit juice machine, a reamer and means for rotating it, a pair of fruit-gripping hands mounted on parallel axes offset from the reamer axis and lying in a plane at right angles to said reamer axis, each hand being rotatable about its axis in a plane containing said reamer axis, means for intermittently rotating said hands from a fruit-receiving position to a cutting position opposite each other, and thereafter one of said hands in the same direction until it is brought into position in line with the reamer, while rotating the other hand reversely from the cutting position, and for moving the first hand from the reaming position reversely to and beyond its starting position, while the opposite hand is moved to the reaming position, and finally returning both the hands to the starting position.

4. In a fruit juice machine, a vertical frame, a cam shaft mounted on one side of said frame, a pair of fruit-gripping hands mounted to rotate on horizontal axes supported in said frame and arranged on opposite sides of said cam shaft, means for rotating said hands on their axes, including a cam for each hand on said shaft, a swinging toothed sector pivoted to said frame corresponding to each hand, gears on the hand axes meshing, respectively, with said sectors, and cam followers on said sectors engaging said cams, respectively.

5. In a fruit juice machine, a vertical frame, said frame supporting on opposite sides thereof a pair of rotatable fruit-gripping hands, a single rotating reamer in the plane of rotation of said hands, means for rotating said hands to bring them alternately into cooperative relation with the reamer, and means for relatively approaching each hand and reamer when in such relation to extract the juice from the fruit gripped by such hand.

6. In a fruit juice machine, a hand gripping a fruit, a rotating reamer aligned with said hand and means for rotating it, means for causing a relative approach between said hand and reamer to extract the juice from the fruit gripped by the hand, a juice collector having a part rotating on an axis concentric with the reamer and arranged to catch the extracted juice, and a drive for said reamer and rotatable collector part for driving them at variable speed, at high speed at the initiation of the approach and at reduced speed during the reaming.

7. In a fruit juice machine, a hand gripping a fruit, a rotating reamer aligned with said hand and means for rotating it, means for causing a relative approach and separation between said hand and reamer for extracting the juice from the fruit gripped by the hand, a juice collector surrounding the reamer and hand during the extraction of the juice and having fixed and rotatable parts, said latter rotating within the former, and a driving means for said reamer and the rotatable part of said collector for imparting to said collector part a variable speed of rotation at different periods in said approach and separation movement.

8. In a fruit juice machine, a hand gripping a fruit, a rotating reamer aligned with said hand, and means for so rotating it, means for causing a relative approach and separation movement between said hand and reamer to extract the juice from the fruit gripped by the hand, a juice collector surrounding said hand and reamer in their extracting position, said collector having a fixed annular channel communicating with a discharge spout, and a rotatable collector part turning in said fixed part and sweeping the juice into said spout and a drive to said reamer and rotatable collector part including a high-speed shaft, a low-speed shaft, and a clutch for connecting the reamer and rotatable collector part to either of said shafts depending upon the relative approach and separation position of the reamer with respect to the hand.

9. In a fruit juice machine, a reamer mounted on a rotating shaft, a juice collector part mounted to rotate with the reamer shaft, a drive to the reamer shaft including a high-speed shaft, a low-speed shaft, and clutch mechanism for connecting said reamer shaft to rotate either with the high-speed shaft or the low-speed shaft, said clutch mechanism being automatically operative to connect the reamer shaft with the high speed shaft upon completion of the reaming operation.

10. In a machine of the class described, a frame, a reamer supported for rotation on a vertical shaft in said frame, a motor connected to drive said shaft, said shaft being in two parts, joined so as to rotate together, but having telescopic movement relative to each other, and means for so relatively moving them to raise and lower the reamer, and means in said driving connection for driving the reamer at varying speeds dependent upon its relative vertical position.

11. In a machine of the class described, a frame, a reamer and juice collector supported for rotation on a vertical shaft in said frame, said shaft being rotatably connected to a clutch plate, and having telescopic movement for raising and lowering the reamer with concentric high and low speed shafts driven from motor, clutch plates secured, respectively, to said high and low speed shafts, for alternate engagement with the clutch plate of said first-named shaft, whereby to drive the reamer and collector part at high or low speed from the motor.

12. In a machine of the class described, a reamer shaft having telescopic engagement with a clutch plate secured to rotate therewith and a pair of concentric drive shafts adapted to be driven at high and low speeds, and each having a clutch plate secured thereto in cooperative relation with said first-named plate, means for raising and lowering the reamer shaft for causing its clutch plate to alternately engage the high and low speed clutch plates whereby to drive it alternately at high or low speed.

13. In a machine of the class described, a reamer and reamer shaft, a juice-collector part concentric therewith and driven from the reamer shaft, means for raising and lowering the reamer and its shaft to move it to operative reaming position and vice versa, and means for driving said reamer shaft at low speed when in its raised reaming position, at high speed as it approaches its lowered position, and for applying a brake in its extreme lower position to stop the machine.

14. In a machine of the class described, a reamer and a reamer shaft, a juice-collector housing surrounding the reamer and having a rotatable part to sweep the extracted juice into a discharge spout, said rotatable part being connected to rotate with the reamer shaft, means for raising and lowering the reamer and its shaft to operative and inoperative positions, respectively, and means for speeding up the reamer shaft as the reamer approaches its lowered position to clean the juice and refuse from the collector housing.

15. In a machine of the class described, a frame, a knife for cutting the fruit in two, said knife being mounted on the frame to swing on a horizontal axis, means for actuating the knife comprising a gear sector concentric with its axis, a toothed rack in engagement with said sector and carrying a cam follower, a spring urging said rack in a direction to swing the knife for its cutting function, and a cam engaging said cam follower for cocking said knife and spring.

16. In a machine of the class described, means for extracting the juice of a fruit and delivering it through a discharge spout, a hanger comprising a plate-like member pivoted at the top of said spout, disposed between the spout and the front of the machine and being of a size concealing the spout from view at the front of the machine, a strainer associated with said spout, said strainer being connected to said hanger, and means for swinging the hanger to move the strainer to operative or inoperative position.

17. In a machine of the class described, a frame, a reamer supported for rotation on a vertical axis in said frame, a pair of fruit-gripping hands mounted on horizontal shafts one at each side of the reamer, means for simultaneously rotating the shafts in opposite directions to cause both hands to grip the fruit, means for locking the hands in the position in which they have been so moved, a knife for cutting the fruit in said position, said knife being mounted on the frame to swing on a horizontal axis and means for actuating said knife, hands and locking means in proper synchronism comprising a common cam shaft mounted in said frame.

18. In a machine of the class described, a frame, a reamer supported for rotation on a vertical axis in said frame, a pair of fruit-gripping hands mounted on horizontal shafts one at each side of the reamer, means for simultaneously rotating the shafts in opposite directions to cause both hands to grip the fruit, means for locking the hands in the position in which they have been so moved, a knife for cutting the fruit in said position, said knife being mounted on the frame to swing on a horizontal axis, means for actuating the knife comprising a gear sector concentric with its axis, a toothed rack in engagement with said sector and carrying a cam follower, a spring urging said rack in a direction to swing the knife for its cutting function, and a cam engaging said cam follower for cocking said knife and spring.

19. In a fruit juice machine, a reamer and means for rotating it, a fruit-gripping hand mounted on an axis offset from the reamer axis and extending at right angles to a plane containing said reamer axis, an angularly extending arm connecting said hand to its axis, said hand being arranged to rotate substantially in said plane containing the reamer axis, means for rotating said hand on its axis to bring the hand in line with the reamer axis, means for causing a relative approach of said reamer and hand to extract the juice from the fruit gripped by the hand.

20. In a fruit juice extracting machine, a frame, a centrally disposed reamer mounted in said frame on a vertical axis, means for rotating the reamer, a pair of fruit gripping hands mounted in the frame on parallel axes, which axes lie in a plane at right angles to the reamer axis, the hands being disposed in a plane containing the reamer axis, and means for rotating said hands intermittently first from a vertical starting position with one hand gripping a fruit toward each other to a cutting position in which both hands grip the fruit while it is cut in two, then continuing the rotation of one hand to the reaming position in line with the reamer and rotating the other hand reversely to the starting position, then reversely rotating said one hand from the reaming position past the starting position to an ejecting position where the skin is ejected and rotating said other hand simultaneously to the reaming position, then returning said one hand from the ejecting position to the starting position and reversely rotating said other hand in reaming position to the ejecting position and finally returning it to the starting position.

21. In a fruit juice extracting machine, a vertical main frame arranged to have its greatest dimension extend transversely of the front of the machine, a vertical cam shaft mounted in bearings at the rear of said frame and arranged to operate, in timed relation, a plurality of mechanisms for feeding, cutting and presenting a fruit to a reaming position, a vertical reamer shaft carrying a reamer at its upper end for extracting the juice of a fruit in the reaming position, said reamer shaft being mounted in bearings at the front of said main frame, a motor mounted at the bottom of said frame, direct-driving connections between said motor and reamer shaft, and driving connections through reduction gearing from the motor to the cam shaft.

22. In a machine of the class described, a vertically movable reamer and reamer shaft, a collector housing mounted concentric with said shaft, and having an opening in its top portion to receive a hand gripping a fruit in the reaming position, the hand substantially filling said opening when the hand is in the reaming position, said hand being moved to said position filling the opening prior to the commencement of the reaming operation and being surrounded by a yielding sealing ring adapted to engage the margin of the opening to positively seal the collector housing during the reaming operation.

CHARLES ZIENUS MONROE.